United States Patent
Champernowne

(10) Patent No.: US 10,346,402 B2
(45) Date of Patent: Jul. 9, 2019

(54) OPTIMIZED SYSTEM AND METHOD FOR FINDING BEST FARES

(75) Inventor: Arthur Francis Champernowne, Seattle, WA (US)

(73) Assignee: Expedia, Inc., Bellevue, WA (US)

(*) Notice: Subject to any disclaimer, the term of this patent is extended or adjusted under 35 U.S.C. 154(b) by 541 days.

(21) Appl. No.: 12/470,442

(22) Filed: May 21, 2009

(65) Prior Publication Data
US 2009/0234681 A1  Sep. 17, 2009

Related U.S. Application Data

(60) Division of application No. 12/126,804, filed on May 23, 2008, now abandoned, which is a continuation of application No. 09/825,451, filed on Apr. 2, 2001, now abandoned.

(51) Int. Cl.
| | |
|---|---|
| G06Q 10/02 | (2012.01) |
| G06F 16/2455 | (2019.01) |
| G06F 16/22 | (2019.01) |
| G06F 16/2457 | (2019.01) |
| G06Q 50/14 | (2012.01) |

(52) U.S. Cl.
CPC ...... *G06F 16/2455* (2019.01); *G06F 16/2246* (2019.01); *G06F 16/24578* (2019.01); *G06Q 10/02* (2013.01); *G06Q 50/14* (2013.01)

(58) Field of Classification Search
USPC .......................................................... 705/5–7
See application file for complete search history.

(56) References Cited

U.S. PATENT DOCUMENTS

| | | | | |
|---|---|---|---|---|
| 5,021,953 | A | | 6/1991 | Webber et al. |
| 5,177,684 | A | * | 1/1993 | Harker et al. ............... 701/117 |
| 5,331,546 | A | | 7/1994 | Webber et al. |
| 5,537,593 | A | * | 7/1996 | Diamond et al. ............ 719/313 |
| 5,623,413 | A | | 4/1997 | Matheson et al. |
| 5,832,453 | A | * | 11/1998 | O'Brien ........................... 705/6 |
| 5,832,454 | A | | 11/1998 | Jafri et al. |
| 6,029,162 | A | | 2/2000 | Schultz |
| 6,119,094 | A | | 9/2000 | Lynch et al. |
| 6,278,997 | B1 | * | 8/2001 | Agrawal et al. |
| 6,295,521 | B1 | | 9/2001 | DeMarcken et al. |
| 6,304,850 | B1 | * | 10/2001 | Keller et al. ..................... 705/5 |
| 6,336,097 | B1 | | 1/2002 | Scipioni |

(Continued)

FOREIGN PATENT DOCUMENTS

| | | |
|---|---|---|
| AU | 2002250493 | 10/2008 |
| HK | 1071218 A | 7/2005 |

(Continued)

OTHER PUBLICATIONS

Hillier, et al., Operations Research, 1974, Holden-Day, 2nd ed., 697-702.*

(Continued)

*Primary Examiner* — Daniel Vetter
(74) *Attorney, Agent, or Firm* — Knobbe, Martens, Olson & Bear, LLP

(57) ABSTRACT

The present invention provides a method, apparatus and system for processing fare queries to find the best fares. In one embodiment of this invention a query server utilizes a branching and bounding based technique to implicitly enumerate possible solutions to arrive at best fare solutions.

10 Claims, 19 Drawing Sheets

(56) References Cited

U.S. PATENT DOCUMENTS

| | | | |
|---|---|---|---|
| 6,704,692 B1* | 3/2004 | Banerjee et al. | 702/189 |
| 7,181,410 B1* | 2/2007 | Jones et al. | 705/6 |
| 7,263,494 B1* | 8/2007 | Harris | 705/5 |
| 7,668,740 B1* | 2/2010 | Baggett et al. | 705/5 |

FOREIGN PATENT DOCUMENTS

| | | |
|---|---|---|
| IN | 236196 | 10/2009 |
| SG | 96956 | 11/2006 |
| WO | WO 00/02152 A2 | 1/2000 |
| WO | WO00/02153 | 1/2000 |
| WO | WO00/13124 A1 | 3/2000 |
| WO | WO01/29693 A2 | 4/2001 |
| WO | WO02/080071 | 10/2002 |

OTHER PUBLICATIONS

Pardalos, et al., A Branch and Bound Algorithm for the Maximum Clique Problem, Computers Ops. Res., vol. 19, No. 5, 1992, pp. 363-375.*

Gendreau, et al., An Efficient Implicit Enumeration Algorithm for the Maximum Clique Problem, Advances in Optimization and Control, Springer-Verlag, 1988, pp. 79-91.*

Nastansky, et al., Cost-Minimal Trees in Directed Acyclic Graphs, Zeitschrift für Operations Research, Physica-Verlag, vol. 18, No. 1, Feb. 1974, pp. 59-67.*

Expedia.com Helps Travelers Build the Ultimate Itinerary With Enhancements to Air, Car and Lodging Services, PR Newswire http://proquest.umi.com [accessed Jul. 25, 2002], Nov. 14, 2000, New York, New York, U.S.

Directed Acyclic Graphs (pp. 1-4), Directed Acyclic Graph (1 page) and Directed Acyclic Graphs (1 page), retrieved from an internet search.

Des Ruisseau, R., Have Computer, You Can Travel Websites Help Save Some Money on Fares, Denver Post, Feb. 16, 1998, Denver, Colorado, U.S.

Proctor, L., Amadeus: Amadeus Enables Lowest Possible Air Fare Search on Line, M 2 Presswire, Feb. 28, 2000, Coventry.

Trottman, M., E-Business: Expedia to Unveil Travel-Site Technology, The Wall Street Journal http://proquest.umi.com [accessed Jul. 25, 2002], Jan. 22, 2001, New York, New York, U.S.

Woods, L., E-Booking Takes Off, Kiplinger's Personal Finance Magazine, Aug. 2000.

Clausen, "Branch and Bound Algorithms—Principles and Examples," Department of Computer Science, University of Copenhagen, Mar. 12, 1999.

International Search Report in PCT/US02/10201, dated Apr. 16, 2004.

Office Action in Canadian Application No. 2,442,108, dated Mar. 10, 2015.

Office Action in Canadian Application No. 2,442,108, dated May 30, 2012.

Office Action in Chinese Patent Application No. 201110368759.1, dated Mar. 12, 2015.

* cited by examiner

```
┌─────────────────────────────────────────────────┐
│▫                 ▓FARE SEARCH▓                 ▫│
├─────────────────────────────────────────────────┤
│                  FARE SEARCH                     │
│  ⊙ ROUND TRIP    ○ ONE WAY                       │
│    LEAVING FROM:           GOING TO:             │
│    ┌──────────────┐        ┌──────────────┐      │
│    │LAX           │        │SEA           │      │
│    └──────────────┘        └──────────────┘      │
│                                                  │
│    DEPARTING: (MM/DD/YY)   RETURNING: (MM/DD/YY) │
│    ┌──────────┐            ┌──────────┐          │
│    │04/16/01  │            │04/26/01  │          │
│    └──────────┘            └──────────┘          │
│                                                  │
│                                    ⊙ INFANTS IN  │
│   ADULTS   SENIORS  CHILDREN INFANTS  SEATS      │
│  (12 TO 61)(AGE 62+)(2 TO 11)(UNDER 2)           │
│  ┌──┐     ┌──┐     ┌──┐     ┌────┐  ○ INFANTS IN │
│  │1 │     │0 │     │0 │     │AND │    LAPS      │
│  └──┘     └──┘     └──┘     └────┘               │
│                                                  │
│                                                  │
│  SEARCH OPTIONS                                  │
│  ┌────────────────────────┐                      │
│  │SEARCH ALL AIRLINES     │                      │
│  └────────────────────────┘                      │
│                                                  │
│      ┌──────────────┐      ┌──────────────┐      │
│      │   SUBMIT     │      │    CLEAR     │      │
│      └──────────────┘      └──────────────┘      │
└─────────────────────────────────────────────────┘
                     1600 ─┘
```

*Fig.16.*

OPTIMIZED SYSTEM AND METHOD FOR FINDING BEST FARES

CROSS-REFERENCE TO RELATED APPLICATIONS

This application is a divisional of U.S. patent application Ser. No. 12/126,804, filed May 23, 2008 now abandoned, which is a continuation of U.S. patent application Ser. No. 09/825,451, filed Apr. 2, 2001 now abandoned.

BACKGROUND OF THE INVENTION

Field of the Invention

The present invention relates in general to on-line transportation reservation processing and, in particular, to a system, apparatus and method for providing automatic determination of the best fares for an on-line reservation or fare inquiry.

Description of the Related Art

Communication networks are well known in the computer communications field. By definition, a network is a group of computers and associated devices that are connected by communications facilities or links. Network communications can be of a permanent nature, such as via cables, or can be of a temporary nature, such as connections made through telephone or wireless links. Networks may vary in size, from a local area network ("LAN") consisting of a few computers or workstations and related devices; to a wide area network ("WAN") which interconnects computers and LANs that are geographically dispersed; to a remote access service ("RAS") which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol ("IP") along with higher level protocols such as the Transmission Control Protocol/Internet Protocol ("TCP/IP") or the Uniform Datagram Packet/Internet Protocol ("UDP/IP") to communicate with one another.

The Internet has recently seen explosive growth by virtue of its ability to link computers located throughout the world. As the Internet has grown, so has the World Wide Web ("WWW" or "Web"). The Web is a vast collection of interconnected or "hypertext" documents in HyperText Markup Language ("HTML") that are electronically served at "Web sites" throughout the Internet. The Web has quickly become a popular method of disseminating information due in large part to its simplicity and its ability to deliver information in a variety of formats. To make information available over the Web, a user typically composes a set of "Web pages" which are posted on a Web site by an Internet Service Provider ("ISP"). A Web site resides on a server connected to the Internet that has mass storage facilities for storing hypertext documents, a.k.a. "Web pages," and that runs administrative software for handling requests for those stored hypertext documents. A hypertext document normally includes a number of hyperlinks, i.e., highlighted portions of text which link the document to another hypertext document possibly stored at a Web site elsewhere on the Internet. Each hyperlink is associated with a Uniform Resource Locator ("URL") that provides the exact location of the linked document on a server connected to the Internet and describes the document. Thus, whenever a hypertext document is retrieved from any Web server, the document is considered to be retrieved from the Web.

A user is allowed to retrieve hypertext documents from the Web, i.e., a user is allowed to "surf the Web," via a Web browser. A Web browser, such as NETSCAPE NAVIGATOR®, MICROSOFT® Internet Explorer or phone.com's UP.link microbrowser, is a software program implemented by a Web client, i.e., the user's computer, cell phone or other client device, to provide a graphical user interface ("GUI") to the Web. Upon request from the user via the Web browser, the Web client accesses and retrieves the desired hypertext document from the appropriate Web server using the URL for the document and a protocol known as HyperText Transfer Protocol ("HTTP"). HTTP is a higher-level protocol than TCP/IP and is designed specifically for the requirements of the Web. It is used on top of TCP/IP to transfer hypertext documents between servers and clients.

At the advent of the Web, the information stored on the Internet was generally static in nature and if one wanted to change the information provided on a Web site it was necessary to manually configure the Web site by rewriting its HTML code. However, at the present stage of development on the Web, many Web sites provide dynamic content that changes depending on a user's interaction between the Web browser on the user's client device and the Web site. These dynamic hypertext documents are well known in the art and may be produced in a myriad of different manners, such as by using Common Gateway Interface ("CGI") scripts processed by a Web server or local scripts just as JAVAScript processed by a Web browser.

The present invention relates to network-based, and Internet-based travel services, such as a travel service offering tickets for transportation, including airline tickets, train tickets, bus tickets, ferry tickets, etc. to customers over the Internet. With such a service, a customer, using a computer connected to the travel service via the Internet, can purchase items from a dynamically changing inventory including airline tickets, train tickets, bus tickets, ferry tickets, etc., or combinations thereof. Typically, a travel service cooperates with a centralized computer reservation system ("CRS"). A CRS is a system/service that communicates with travel agents transportation providers or services for the purpose of providing up-to-date fare (price for the trip or combination of routs comprising a trip), schedule (date and time of arrival and departure of a trip or flight), rules (which fares are valid under which circumstances) and availability (capacity for a particular trip or flight to provide accommodation at a particular fare) in response to a query. This information is provided to the CRS by the transportation carriers, typically through third parties; however, a travel service can also cooperate with other databases, such as a local database reflecting specific relationships between carriers and the travel service, such as discount contracts or incentive programs. Accordingly, an Internet-based service can have access to many sources of carrier inventory and prices.

The business environment of a travel service is such that there are numerous ways of providing the same or a similar end product to the consumer at a variety of prices. Due to carrier-driven preferences, it may be cost effective to price similar inventory differently. For example, in the case of airline reservations, the number of ways that a consumer can travel from point A to point B is great when the number of airline carriers, different travel paths, hub locations and other particulars are considered. For this reason, the price of a particular generic segment from point A to point B may vary considerably across time, airline carriers, and the like. Further, compounding price variations are price sensitivities, which can reflect, e.g., an increase in demand for tickets reserved proximate to departure time. Additionally, incentive and discount programs negotiated with individual carriers can further affect the price offered by a travel service. Also, certain classes of inventory may have associated high or low demands, or high or low volume sales.

In addition, there are numerous consumer driven preferences which can affect pricing as well. Some consumers will value individual characteristics of a given item of inventory differently. For example, in the case of airline tickets, a consumer may not value when the flight (flying from one place to the next) takes place whereas another consumer may value a particular carrier over all others. These preferences can be factored into flights offered when the consumer specifies the preference. For these reasons and others, there are numerous factors that can affect the value of the same or similar end product.

Furthermore, in a conventional Internet-based travel service, a consumer enters very specific information concerning desired supplier inventory, and the internet-based travel service queries a CRS for inventory that matches that specific query. The CRS performs a search of its database to find matches for the query and returns a result set to the Internet-based travel service for viewing by the consumer. However, a traditional CRS search in response to a query is limited.

One limitation results from the fact that there are numerous ways of providing the same end product to the consumer. For example, there are an incalculable number of ways to travel from point A to point B when different suppliers, travel routes, and other particulars are considered. Thus, for economic reasons, the CRS typically spends a fixed amount of time searching its database for information fulfilling the query. Consequently, when a CRS returns results to a travel service in response to a query, the CRS returns very limited and usually non-optimized results for that particular query, simply because not every permutation or combination of possible inventory elements can be searched. As a result, some inventory that matches the query does not appear in the result set returned by the CRS. Thus, it would be beneficial to provide a service capable of a more exhaustive inquiry without incurring substantial or prohibitive increases in CRS search time and computing power. The provision of such a benefit would enrich the consumer experience and consequently could attract additional consumers and secure repeat customers.

Additionally, it is well known in the art to search for fares by only examining fares for routes that pass through a small set of connection points between an origin and a destination. Then, by explicitly enumerating all the possible combinations of routes between the origin, connection points and destination, it is possible to find the least costly (in both time and price) route(s). However, this approach is still costly and is also inexact and inflexible. As new routes are scheduled or removed by carriers, all the predetermined connection point sets need to be recalculated. Even if only a limited number of connection points are provided, it may still be computationally prohibitive to explicitly enumerate even a limited set of route/fare combinations. Additionally, if only a limited number of connections are examined, then it may be possible to miss the optimal solution if the optimal solution passes through a connection point that is not among the predetermined connection points.

There are other heuristic approaches known to those of ordinary skill in the art to arrive at inexact determinations of a best fare from an origin to a destination; however, these heuristic approaches are still not exact solutions, as heuristic algorithms are inexact by their very nature.

Therefore, there is a need for an approach to find best fares in a computationally non-prohibitive manner that is also exact and does not ignore possible route/fare combinations unless it is known that they are not best fares.

SUMMARY OF THE INVENTION

The present invention solves the problem of finding best fares in a non-prohibitive manner by utilizing a query server with a branching and bounding based technique to implicitly enumerate possible travel solutions to arrive at best fare solutions. By using an implicit enumeration, the In one exemplary method of finding best fares for a trip, the fares are found by determining a set of partial fare solutions for the trip, adding trip information to the partial fare solutions in order to define a set of complete fare solutions and as trip information is added to the partial fare solutions, eliminating partial fare solutions that are non-optimal partial solutions. Then, returning a subset (either a predetermined number or an exhaustive set) of said complete fare solutions as the best fares for the trip.

Adding trip information in one exemplary embodiment may comprise supplying a fare query to a root node in a solution tree, assigning fare components corresponding to said root node to a first level of nodes, assigning carriers for the fare components to a second level of nodes, assigning flights to fare components with assigned carriers to a third level of nodes, grouping the flights into priceable units to a fourth level of nodes; and assigning at fares to the priceable units in leaf nodes.

Adding trip information and eliminating partial fare solutions may be performed in a recursive or an iterative manner, so long as the possible solutions are at least implicitly examined. In fact, adding trip information and eliminating partial fare solutions may be the performed both backward and forward from a destination and origin to further decompose the search for best fares.

In another exemplary embodiment of the present invention the partial fare solutions are eliminated based on an arbitrary threshold cost, while in another the partial fare solutions are eliminated based on a refined lower bound.

In yet another embodiment of the present invention, the partial fare solutions and complete fare solutions are stored in a priority queue.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 16 shows an exemplary Web page for receiving a fare query from a customer.

DETAILED DESCRIPTION OF THE PREFERRED EMBODIMENT

Figure 1:
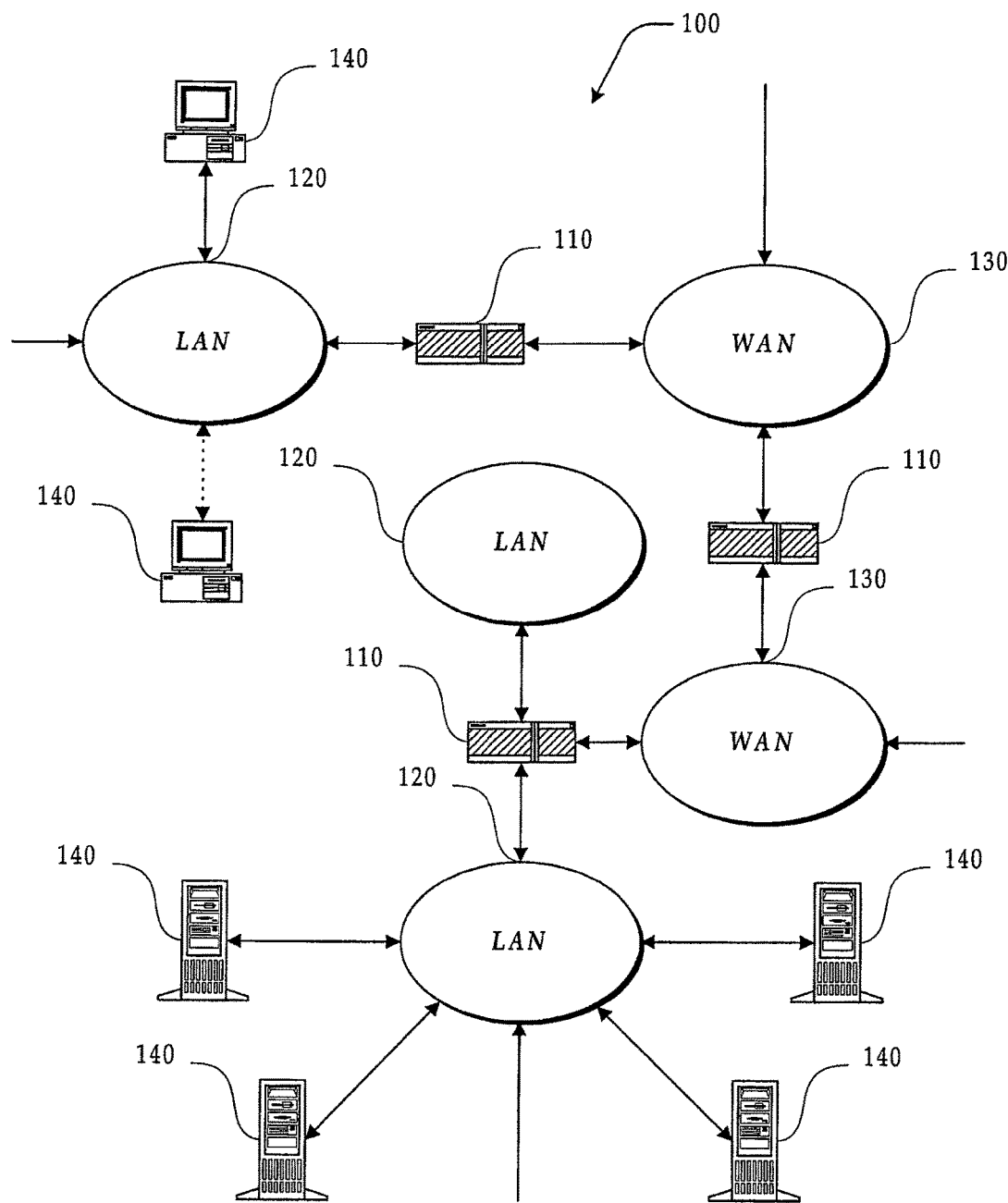
FIG. 1 (Prior Art) is an illustration of a representative portion of an internetwork such as the Internet.

Communication networks are well known in the computer communications field. By definition, a network is a group of computers and associated devices that are connected by communications facilities or links. Network communications can be of a permanent nature, such as via cables, or can be of a temporary nature, such as connections made through telephone or wireless links. Networks may vary in size, from a local area network ("LAN") consisting of a few computers or workstations and related devices; to a wide area network ("WAN") which interconnects computers and LANs that are geographically dispersed; to a remote access service ("RAS") which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol ("IP") along with higher level protocols such as the Transmission Control Protocol/Internet Protocol ("TCP/IP") or the Uniform Datagram Packet/Internet Protocol ("UDP/IP") to communicate with one another.

The Internet has recently seen explosive growth by virtue of its ability to link computers located throughout the world. As the Internet has grown, so has the World Wide Web ("WWW" or "Web"). The Web is a vast collection of interconnected or "hypertext" documents in HyperText Markup Language ("HTML") that are electronically served at "Web sites" throughout the Internet. The Web has quickly become a popular method of disseminating information due in large part to its simplicity and its ability to deliver information in a variety of formats. To make information available over the Web, a user typically composes a set of "Web pages" which are posted on a Web site by an Internet Service Provider ("ISP"). A Web site resides on a server connected to the Internet that has mass storage facilities for storing hypertext documents, a.k.a. "Web pages," and that runs administrative software for handling requests for those stored hypertext documents. A hypertext document normally includes a number of hyperlinks, i.e., highlighted portions of text which link the document to another hypertext document possibly stored at a Web site elsewhere on the Internet. Each hyperlink is associated with a Uniform Resource Locator ("URL") that provides the exact location of the linked document on a server connected to the Internet and describes the document. Thus, whenever a hypertext document is retrieved from any Web server, the document is considered to be retrieved from the Web.

A user is allowed to retrieve hypertext documents from the Web, i.e., a user is allowed to "surf the Web," via a Web browser. A Web browser, such as NETSCAPE NAVIGATOR®, MICROSOFT® Internet Explorer or phone.com's UP.link microbrowser, is a software program implemented by a Web client, i.e., the user's computer, cell phone or other client device, to provide a graphical user interface ("GUI") to the Web. Upon request from the user via the Web browser, the Web client accesses and retrieves the desired hypertext document from the appropriate Web server using the URL for the document and a protocol known as HyperText Transfer Protocol ("HTTP"). HTTP is a higher-level protocol than TCP/IP and is designed specifically for the requirements of the Web. It is used on top of TCP/IP to transfer hypertext documents between servers and clients.

At the advent of the Web, the information stored on the Internet was generally static in nature and if one wanted to change the information provided on a Web site it was necessary to manually configure the Web site by rewriting its HTML code. However, at the present stage of development on the Web, many Web sites provide dynamic content that changes depending on a user's interaction between the Web browser on the user's client device and the Web site. These dynamic hypertext documents are well known in the art and may be produced in a myriad of different manners, such as by using Common Gateway Interface ("CGI") scripts processed by a Web server or local scripts just as JAVAScript processed by a Web browser.

The present invention relates to network-based, and Internet-based travel services, such as a travel service offering tickets for transportation, including airline tickets, train tickets, bus tickets, ferry tickets, etc. to customers over the Internet. With such a service, a customer, using a computer connected to the travel service via the Internet, can purchase items from a dynamically changing inventory including airline tickets, train tickets, bus tickets, ferry tickets, etc., or combinations thereof. Typically, a travel service cooperates with a centralized computer reservation system ("CRS"). A CRS is a system/service that communicates with travel agents transportation providers or services for the purpose of providing up-to-date fare (price for the trip or combination of routs comprising a trip), schedule (date and time of arrival and departure of a trip or flight), rules (which fares are valid under which circumstances) and availability (capacity for a particular trip or flight to provide accommodation at a particular fare) in response to a query. This information is provided to the CRS by the transportation carriers, typically through third parties; however, a travel service can also cooperate with other databases, such as a local database reflecting specific relationships between carriers and the travel service, such as discount contracts or incentive programs. Accordingly, an Internet-based service can have access to many sources of carrier inventory and prices.

The business environment of a travel service is such that there are numerous ways of providing the same or a similar end product to the consumer at a variety of prices. Due to carrier-driven preferences, it may be cost effective to price similar inventory differently. For example, in the case of airline reservations, the number of ways that a consumer can travel from point A to point B is great when the number of airline carriers, different travel paths, hub locations and other particulars are considered. For this reason, the price of a particular generic segment from point A to point B may vary considerably across time, airline carriers, and the like. Further, compounding price variations are price sensitivities, which can reflect, e.g., an increase in demand for tickets reserved proximate to departure time. Additionally, incentive and discount programs negotiated with individual carriers can further affect the price offered by a travel service. Also, certain classes of inventory may have associated high or low demands, or high or low volume sales.

In addition, there are numerous consumer driven preferences which can affect pricing as well. Some consumers will value individual characteristics of a given item of inventory differently. For example, in the case of airline tickets, a consumer may not value when the flight (flying from one place to the next) takes place whereas another consumer may value a particular carrier over all others. These preferences can be factored into flights offered when the consumer specifies the preference. For these reasons and others, there are numerous factors that can affect the value of the same or similar end product.

Furthermore, in a conventional Internet-based travel service, a consumer enters very specific information concerning desired supplier inventory, and the internet-based travel service queries a CRS for inventory that matches that specific query. The CRS performs a search of its database to find matches for the query and returns a result set to the Internet-based travel service for viewing by the consumer. However, a traditional CRS search in response to a query is limited.

One limitation results from the fact that there are numerous ways of providing the same end product to the consumer. For example, there are an incalculable number of ways to travel from point A to point B when different suppliers, travel routes, and other particulars are considered. Thus, for economic reasons, the CRS typically spends a fixed amount of time searching its database for information fulfilling the query. Consequently, when a CRS returns results to a travel service in response to a query, the CRS returns very limited and usually non-optimized results for that particular query, simply because not every permutation or combination of possible inventory elements can be searched. As a result, some inventory that matches the query does not appear in the result set returned by the CRS. Thus, it would be beneficial to provide a service capable of a more exhaustive inquiry without incurring substantial or prohibitive increases in CRS search time and computing power. The provision of such a benefit would enrich the consumer experience and consequently could attract additional consumers and secure repeat customers.

Additionally, it is well known in the art to search for fares by only examining fares for routes that pass through a small set of connection points between an origin and a destination. Then, by explicitly enumerating all the possible combinations of routes between the origin, connection points and destination, it is possible to find the least costly (in both time and price) route(s). However, this approach is still costly and is also inexact and inflexible. As new routes are scheduled or removed by carriers, all the predetermined connection point sets need to be recalculated. Even if only a limited number of connection points are provided, it may still be computationally prohibitive to explicitly enumerate even a limited set of route/fare combinations. Additionally, if only a limited number of connections are examined, then it may be possible to miss the optimal solution if the optimal solution passes through a connection point that is not among the predetermined connection points.

There are other heuristic approaches known to those of ordinary skill in the art to arrive at inexact determinations of a best fare from an origin to a destination, however these heuristic approaches are still not exact solutions, as heuristic algorithms are inexact by their very nature.

Therefore, there is a need for an approach to find best fares in a computationally non-prohibitive manner that is also exact and does not ignore possible route/fare combinations unless it is known that they are not best fares.

DETAILED DESCRIPTION OF THE PREFERRED EMBODIMENT

As previously explained, the capitalized term "Internet" refers to the collection of networks and routers that use the Internet Protocol ("IP") to communicate with one another. A representative section of the Internet 100 is shown in FIG. 1 (Prior Art) in which a plurality of LANs 120 and WANs 130 are interconnected by routers 110. The routers 110 are generally special purpose computers used to interface one LAN or WAN to another. Communication links within the LANs may be twisted pair wire, or coaxial cable, while communication links between networks may utilize 56 Kbps analog telephone lines, or 1 Mbps digital T-1 lines and/or 45 Mbps T-3 lines. Further computers and other related electronic devices can be remotely connected to either the LANs 120 or the WAN 130 via a modem and temporary telephone link. Such computers and electronic devices 140 are shown in FIG. 1 as connected to one of the LANs 120 via dotted lines. It will be appreciated that the Internet comprises a vast number of such interconnected networks, computers and routers and that only a small, representative section of the Internet 100 is shown in FIG. 1.

The Web, on the other hand, is a vast collection of interconnected, electronically-stored information or "content" located on servers connected throughout the Internet 100. Many companies are now providing services and access to their content over the Internet 100 using the Web. For example, a number of companies provide travel services via the Internet 100 that enable customers to make reservations on-line for transportation and lodging. In accordance with the present invention, an optimized system and method are provided that determine the best available fare in response to a fare inquiry made by a user who is considering making a reservation or purchasing a ticket for transportation on-line. While air carriers and flights are used herein as illustrative examples for purposes of discussion of the present invention, it would be appreciated by those of ordinary skill in the art that the present invention applies equally as well to other forms of transportation as well, such as rail, road, water or any other form of transportation amenable to reservations or fare inquiry. Furthermore, the present invention could be applied to pricing products which combine travel with related products such as hotel stays or car rentals; as selecting low price products from a large number of possible combinations is important in this market. Still, further, the present invention could be applied to non-passenger travel as well, inasmuch as package routing and delivery might benefit from best fare searching to increase efficient delivery of packages for the least cost.

Figure 2:
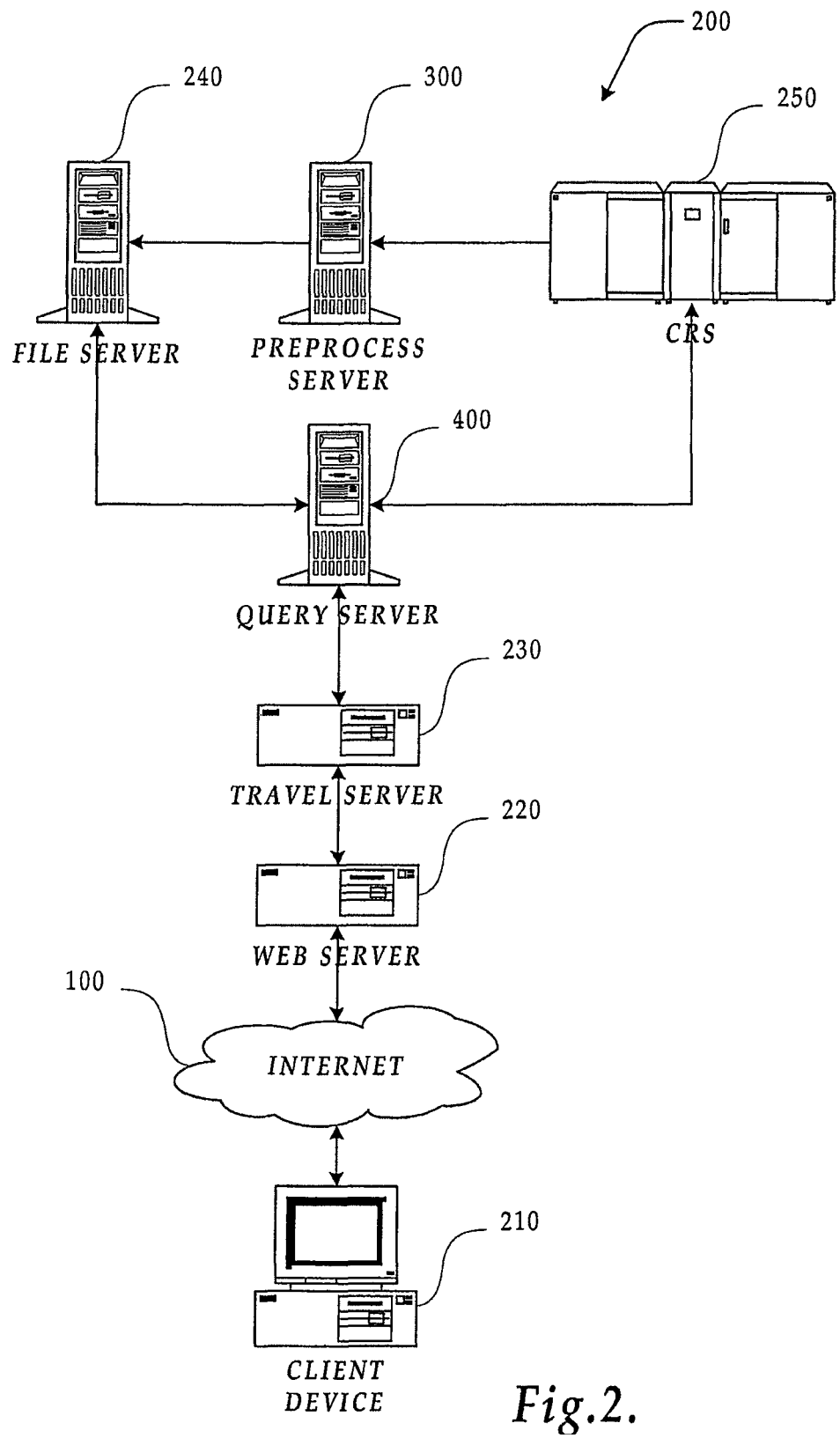
FIG. 2 is a pictorial diagram of a number of devices connected to an internetwork which provide a client device also connected to the internetwork with the best fares in response to a fare query in accordance with the present invention.

FIG. 2 illustrates a functional block diagram of a system 200 for determining the best fare in response to a query made by a user of the client device 210. The system 200 generally operates in a distributed computing environment comprising individual computer systems interconnected over a network (such as the Internet 100). However, it will be appreciated by those of ordinary skill in the art that the system 200 could equally function as a single, stand-alone computer system. In the described embodiment, a preprocess server 300, a file server 240 and a query server 400 are interconnected with one or more client devices 210, Web server(s) 220, and travel server(s) 230 over an internetwork, such as the Internet 100, or perhaps over an intranetwork. The preprocess server 300 and the query server 400 are further described below in relation to FIGS. 3 and 4 respectively. The system 200 also comprises one or more connections to a CRS 250, which as noted above, is a system/service for providing up-to-date fare, schedule and availability information for transportation services. Those of ordinary skill in the art will appreciate that more or less devices may be used in the exemplary system 200. For example, file server 240 may not be necessary if the query server 400 receives information from the CRS 250 directly. As yet another example, the preprocess server 300 may not be necessary if the query server 400 or file server 240 were equipped to preprocess fare information locally.

Figure 3:
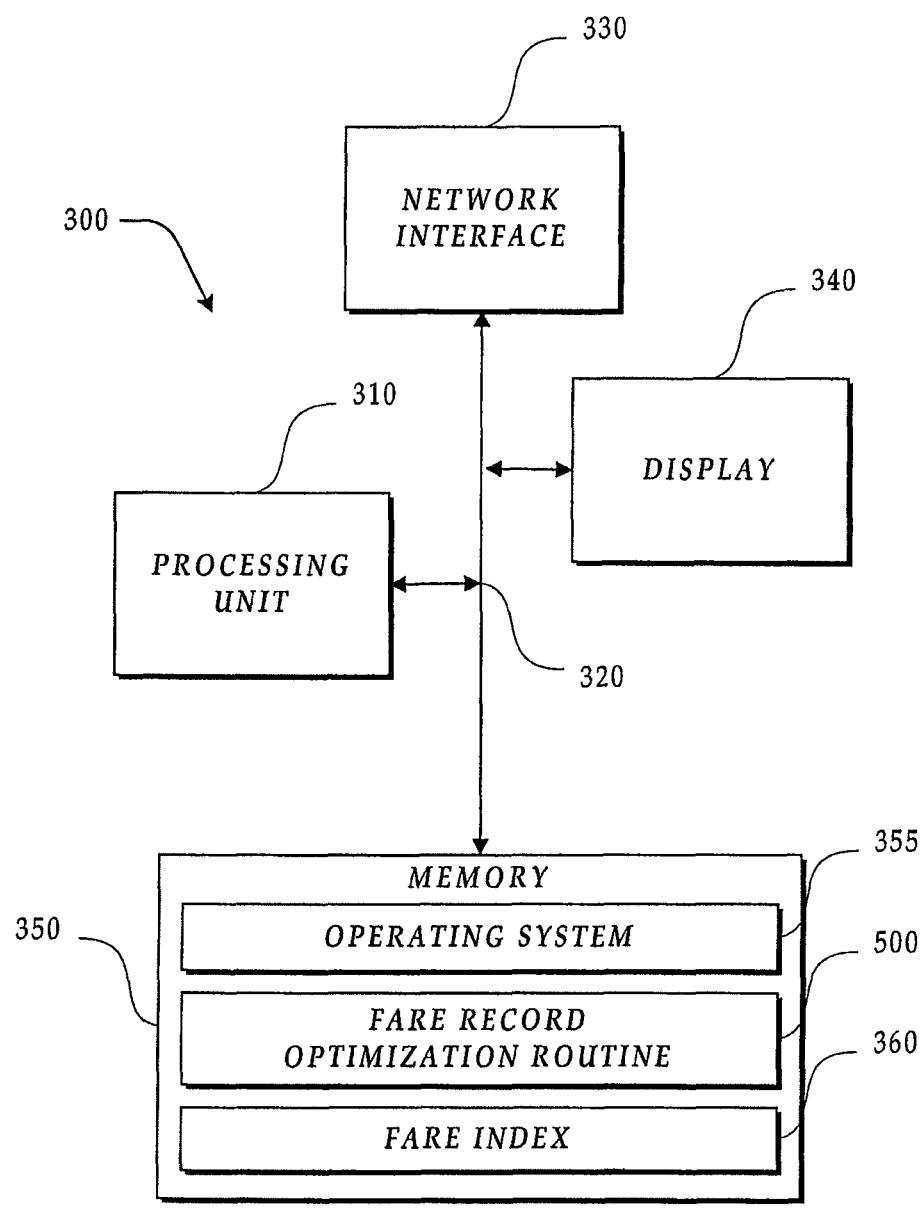
FIG. 3 is a block diagram illustrating several of the components of a preprocess server shown in FIG. 2 used to optimize fare records in accordance with the present invention.

FIG. 3 depicts several of the key components of the preprocess server 300. Those of ordinary skill in the art will appreciate that the preprocess server 300 may include many more components than those shown in FIG. 3. However, it is not necessary that all of these generally conventional components be shown in order to disclose an illustrative embodiment for practicing the present invention. As shown in FIG. 3, the preprocess server 300 includes a network interface 330 for connecting to the Internet 100. Those of ordinary skill in the art will appreciate that the network interface 330 includes the necessary circuitry for such a connection, and is also constructed for use with the TCP/IP protocol or the next generation protocols such as the Internet Inter-ORB Protocol ("IIOP").

The preprocess server 300 also includes a processing unit 310, a display 340, and a memory 350 all interconnected along with the network interface 330 via a bus 320. The memory 350 generally comprises a random access memory ("RAM"), a read-only memory ("ROM") and a permanent mass storage device, such as a disk drive. The memory 350 stores the program code necessary for preprocessing fare records in accordance with the present invention using a fare record optimization routine 500. In addition, memory 350 also stores optional temporary fare record storage referred to as a fare index 360 and an operating system 355. It will be appreciated that these software components may be loaded from a computer-readable medium into memory 350 of the preprocess server 300 using a drive mechanism (not shown) associated with the computer-readable medium, such as a floppy, tape or DVD/CD-ROM drive or via the network interface 330.

Although an exemplary preprocess server 300 has been described that generally conforms to a conventional general purpose computing device, those of ordinary skill in the art will appreciate that a preprocess server 300 may be any of a great number of devices capable of communicating with the Internet 100 or with the query server 400.

Figure 4:
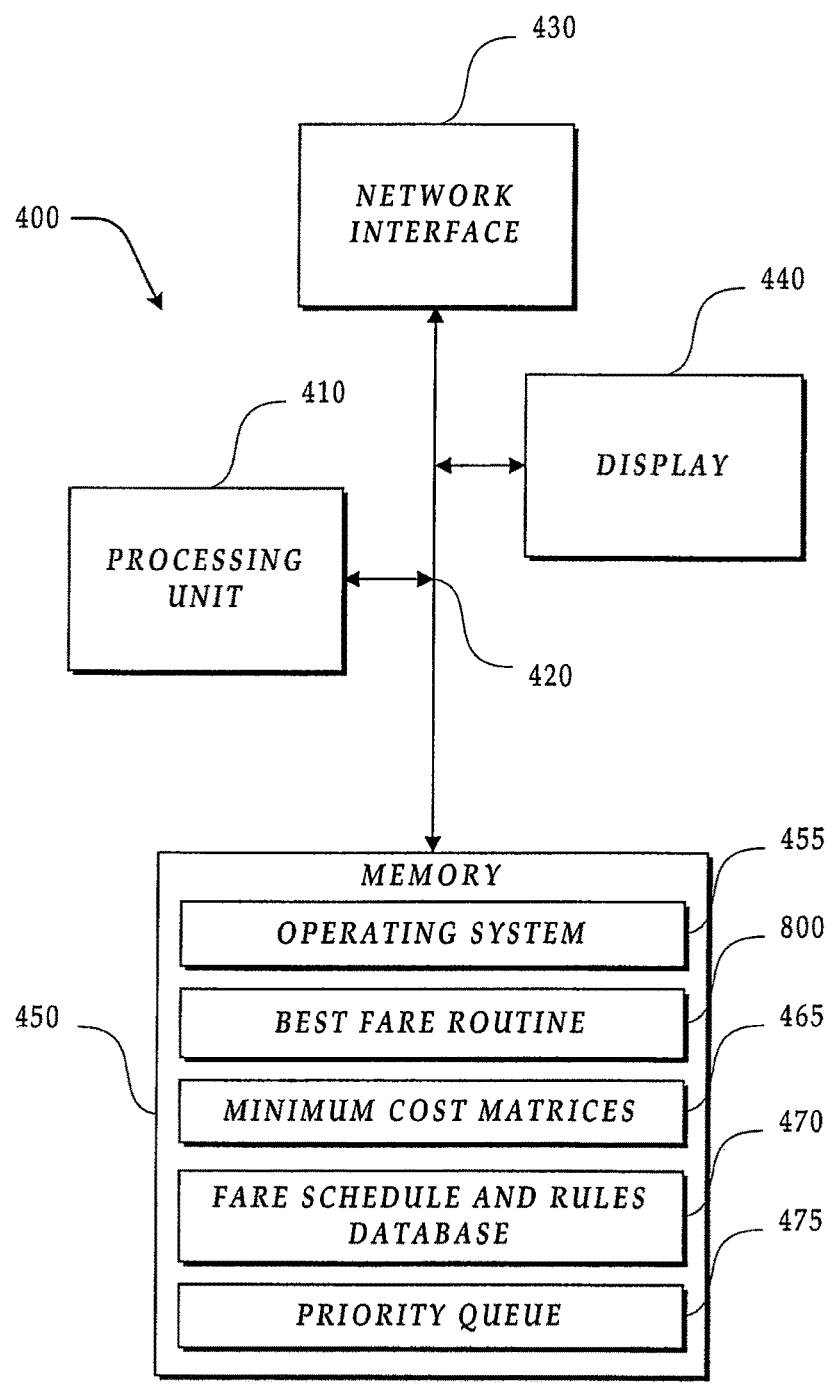
FIG. 4 is a block diagram illustrating several of the components of a query server shown in FIG. 2 used to determine the best fares in response to a fare query in accordance with the present invention.

FIG. 4 depicts several of the key components of the query server 400. Those of ordinary skill in the art will appreciate that the query server 400 includes many more components then those shown in FIG. 4. However, it is not necessary that all of these generally conventional components be shown in order to disclose an illustrative embodiment for practicing the present invention. As shown in FIG. 4, the query server 400 is connected to the Internet 100 via a network interface 430. Those of ordinary skill in the art will appreciate that the network interface 430 includes the necessary circuitry for connecting the query server 400 to the Internet 100, and is also constructed for use with the TCP/IP protocol or the next generation protocols, such as the IIOP, the particular network configuration of the operating environment in which it is contained and a particular type of coupling medium.

Figure 5:
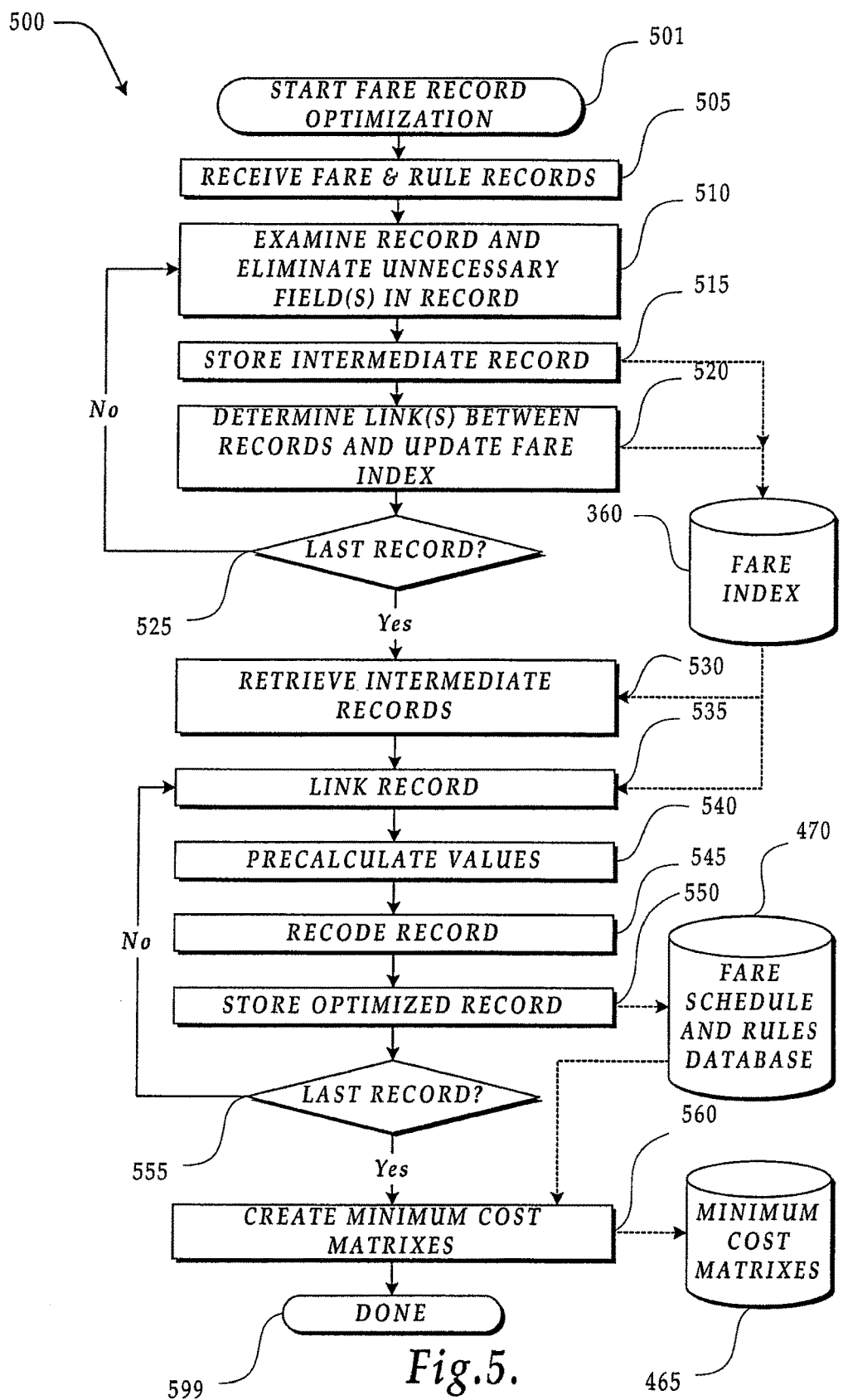
FIG. 5 is an overview flow diagram illustrating a preprocessing routine implemented by the preprocess server to optimize fare records.

The query server 400 also includes a processing unit 410, a display 440, and a mass memory 450 all interconnected along with the network interface 430 via a bus 420. The memory 450 generally comprises RAM, ROM, and one or more permanent mass storage devices, such as a hard disk drive, tape drive, optical drive, floppy disk drive, or combination thereof. The mass memory 450 stores the program code and data necessary for receiving, processing, formatting and sending messages, as well as, supplying the results of that processing to senders in accordance with the present invention. More specifically, the memory 450 stores minimum cost matrices ("MCM") 465 which are used to store precalculated minimum cost fares between travel points (origins and destinations) in an easily accessible matrix format such that given an origin and a destination, it is possible to find the minimum cost of traveling between them. Additionally, the memory 450 stores a fare, schedule and rule database ("FSR") 470, a priority queue 475 and an operating system 455. The FSR is a collection of optimized fare, schedule and rule records that have been preprocessed as described below with regard to FIG. 5. The fare records provide detailed trip information such as, but not limited to, the origin, destination, date, time and price of various trips. The rules records provide different rules (e.g., fare must be purchased 14 days in advance, fare not available if traveling via Denver, etc. . . . ) which may be associated with particular fares to more particularly specify when the fare is valid and how it may be used. The schedule records are more general records which specify the regularly scheduled trips provided by a carrier.

The priority queue 475, on the other hand, is specifically adapted to store information on possible best fares, such that the next piece of information removed (dequeued) from the priority queue 475 is the lowest cost item. It will be appreciated that the aforementioned software components may be loaded from a computer-readable medium into mass memory 450 of the query server 400 using a drive mechanism (not shown) associated with the computer-readable medium, such as floppy, tape or DVD/CD-ROM drive or via the network interface 430.

Although an exemplary query server 400 has been described that generally conforms to a conventional general purpose computing device, those of ordinary skill in the art will appreciate that a query server 400 may be any of a great number of devices capable of communicating via the Internet 100.

As will be described in more detail below, the query server 400 periodically receives optimized fare, schedule and rule records from the preprocess server 300. The query server 400 then uses the optimized fare, schedule and rule records in determining the best fare available in response to a query made for a transportation reservation or ticket purchase. The preprocessing routine 500 for optimizing fare, schedule and rule records is shown in more detail in FIG. 5. The preprocessing routine 500 logic begins in block 501 and proceeds to block 505, where raw fare, schedule and rule records are received from the CRS 250 or the file server 240. The raw fare, schedule and rule records are generally sent by the CRS 250 as Airline Tariff Publishing Company ("ATPCO") format for fare and rule records and Standard Schedules Information Manual ("SSIM") format for schedule records, both of which are text based. It is useful to enhance these formats by making the records more efficient to process. For example, in block 510, the records are examined individually and any unnecessary information or fields are eliminated from the records. As the CRS 250 provides records to many different types of servers, it may provide information in the records that is unnecessary for determining best fares, e.g., in-flight meal data, the source of fare prices, or other information that is not necessary for determining fares. Once a record has been stripped of unnecessary information, an intermediate record is stored in the fare index 360 in the processing server 300 as shown in block 515. Then in block 520, routine 500 examines the stripped, intermediate record for references to links to any other intermediate records stored in the fare index 360. For example, in one exemplary embodiment, a fare record received from the CRS 250 has a description of one or more rule records that may apply to the fare. It is much faster and more efficient during later processing if each fare record does not have to search for the described rule records containing rules that may apply to the fare record. By creating an explicit link (either a pointer, a reference or some other direct mapping to the location of the linked record) to the linked record, there is no need to search for the linked record during later processing. Therefore block 520 seeks out and identifies these associations (links) and indicates where they have been found by updating the fare index 360. Blocks 510, 515 and 520 are repeated until each record received from the CRS 250 is processed and it has been determined in decision block 525 that the last record has been reached. Accordingly, each raw fare record received from the CRS 250 is examined, stripped and stored with its links as an intermediate record in the fare index 360.

After all of the raw fare records received from the CRS 250 have been processed as described above, optimization continues in block 530 where the intermediate records are retrieved from the fare index 360. Then, each of the intermediate records are individually processed by first linking any records which have been identified as having links to at least one other record in block 535. These newly linked records are then stored as intermediate records, form further optimized fare records with explicit links to associated records. Next in block 540 a number of values are precalculated for the current intermediate record. For example, fare records add a list of all rule records to which they could link. This eliminates some runtime link processing associated with records to which the fare could never be linked, also, dollar cost per direction of travel is precalculated (i.e. half the fare level in the case of round trip fares) in order to make one way and round trip fares more directly comparable. It may also be useful to precalculate city codes that correspond to the airport codes (Three Letter Acronyms or "TLAs") in Block 540. Then block 545 recodes any values in the records to more easily process the record in the future. For example, dates are recoded to be represented as a number of days from a fixed base rather than as year, month and day format (YYDDMM). This allows for easier comparisons of dates as integers rather than strings which must first be converted before calculations may be performed on them. The record is then stored, in block 550 as an optimized fare record in the FSR 470 for later retrieval as either a fare record, a rule record or a schedule record. This process repeats with blocks 535, 540, 545 and 550 until decision block 555 determines that the last intermediate record from the fare index 360 has been processed. Then in block 560 the optimized fare records stored in the FSR 470 are examined for the lowest cost fares between any origin and destination points. These lowest cost fares are then stored in the MCM 465 for use by the query server 400 later in determining best fares. Processing then ends at block 599.

The preprocessing routine 500 periodically runs as new fare, rule and schedule records become available. In general, fare, rule and schedule records may be retrieved from the CRS 250 by the file server 240 for easy access by the preprocess server 300. Either at predetermined intervals, or after receiving some indication from the file server 240 or the CRS 250 that new records are available, the preprocess server will retrieve the records from the file server 240 or CRS 250 and run the preprocessing routine 500.

Once the FSR 470 contains optimized records and the MCM 465 have been built, it is possible to use the best fare routine 700 implemented by the query server 400 (illustrated in FIGS. 6-12) to find the best fares. The problem of finding best fares is that there are no easy comparisons for this type of problem. In order to guarantee a given best fare, one must compare the fare to all other possible fare solutions. Doing this explicitly would require a total enumeration of all possible alternative solutions, which is computationally prohibitive. Therefore, the present invention compares a possible fare solution to all other possible solutions implicitly, resulting in only a partial enumeration of all possible alternatives, thereby avoiding the NP time problem.

Figure 14:
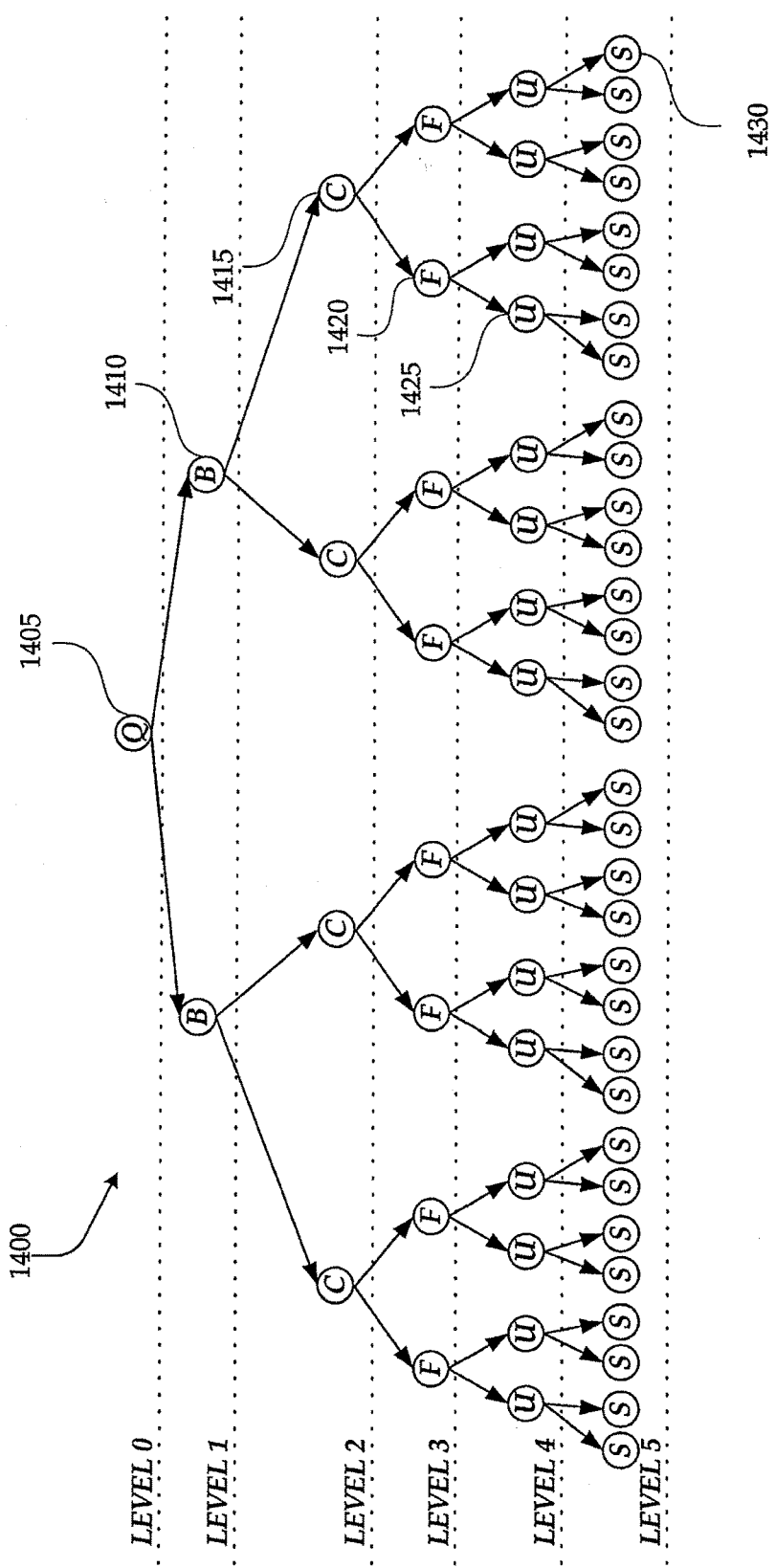
FIG. 14 (Prior Art) shows a complete solution tree diagram to aid in understanding the benefits provided by the current invention.

In prior on-line flight reservation systems, an explicit enumeration of possible solutions is used to determine the best available fares, as shown in FIG. 14. All possible solutions are organized in a solution tree 1400 having a root node 1405 representing a user's fare query. At this point, however, no other nodes have been added to the solution tree 1400. Subsequent nodes are then created and added to the solution tree 1400 that represent "partial solutions" in which some trip information (such as the trip information types used in the present invention: breakpoints, carriers, flights and fares, or any other information that would describe a flight) has been added, while the remaining trip information has yet to be assigned. Once all the trip information needed to determine a fare has been assigned, the solution is considered complete. At each "level" of the tree, one more type of trip information is added to a new unique partial solution to create intermediate nodes until sufficient information has been added to form complete solutions (leaf nodes). For example, at level 1, a breakpoint (any stopping point along a trip which is used for fare purposes) 1410 is assigned which also defines fare components as the travel segments between two breakpoints. At level 2, carriers 1415 are assigned to the fare components between the break points. Then, at level 3 flights 1400 are assigned to fare components with assigned carriers. Level 4 in turn has the assignment of those flights into priceable units 1425. Priceable units may include a group of one or more fare components with a single price assigned to the group by a carrier. Finally at level 5 the fares (including taxes and some changes) are assigned to the priceable units. Only the last (level 5) nodes, so-called "leaves" of the tree, represent "complete" solutions 1430, which means that all trip information has been added to the solution.

In the small solution tree 1400 shown in FIG. 14, with only 32 possible leaf nodes, it is not computationally prohibitive to explicitly enumerate all solutions. However, in a real life example with more than 600 (10,000 if including international) airports, more than 40 carriers, each of which may have more than a single flight between any two airports, and more than one combination of flights into priceable units, not to mention innumerable rules, surcharges, and other factors that need to be considered, the number of partial solutions quickly becomes computationally prohibitive to calculate if an explicit enumeration technique is used.

Figure 13A:
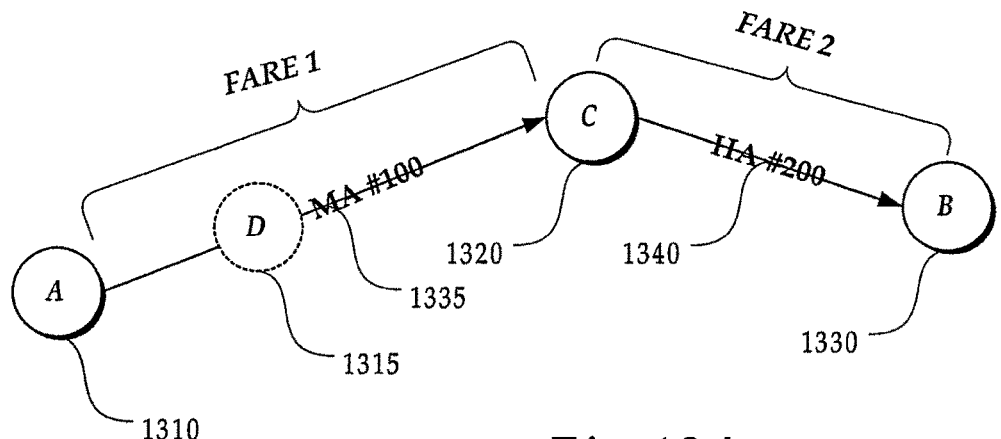
FIGS. 13A-C show route and breakpoint diagrams to aid in understanding the flow diagrams shown in FIGS. 7-12.

In understanding how the present invention is able to find the best fare(s) using only an implicit enumeration of possible solutions in an exemplary context, such as the air transportation context, rather than an explicit enumeration, it is helpful to understand the trip information used to describe and partition the possible solutions. FIG. 13A represents a single trip from an origin at point A 1310 to a destination at point B 1330. The breakpoints (e.g., any point along the route, including the origin and destination) for this flight are at points A 1310, C 1320 and B 1330. Point D 1315 is of some interest as it may also be an airport, but is not considered a breakpoint for purposes of determining carriers, flights or fares. It is merely a stopover point. The trip in FIG. 13A is composed of two fares, a first flight between origin point A and breakpoint C with flight number "MA #100" 1335 that has a stopover at point D 1315; and a second nonstop flight between breakpoint C and destination point B with a flight number "HA #200" 1340. For purposes of the present invention, the "cost" of this a trip is composed of the actual time to get from point A 1310 to point B 1330 combined with the sum of the fares for the flights in between. The combination may be weighted to provide price or total travel time as more important. It will be appreciated by those of ordinary skill in the art that any number of weighting or ranking schemes may be used to determine a cost using price and travel time (possibly including or excluding lay-over time). It is possible that other information may be used in addition or in place of price and travel time. Carrier reliability and/or reputation may also be considered, for example.

Figure 13B:
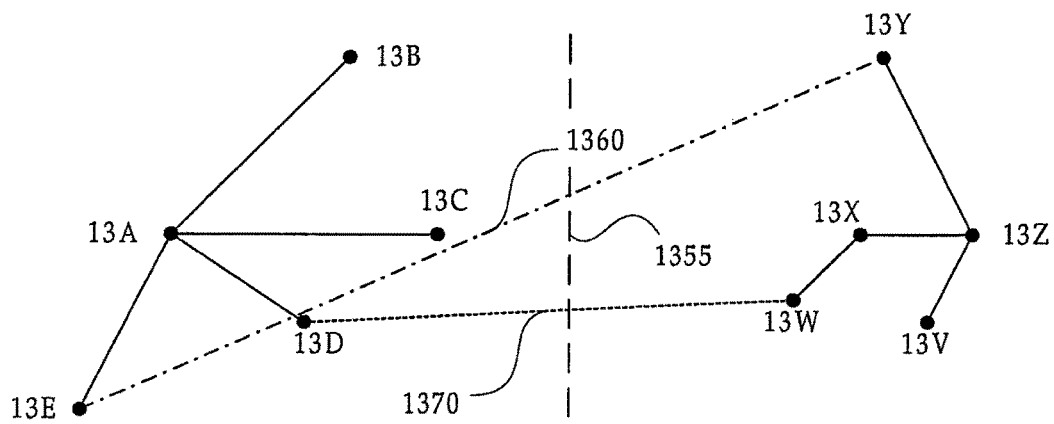
Figure 13C:
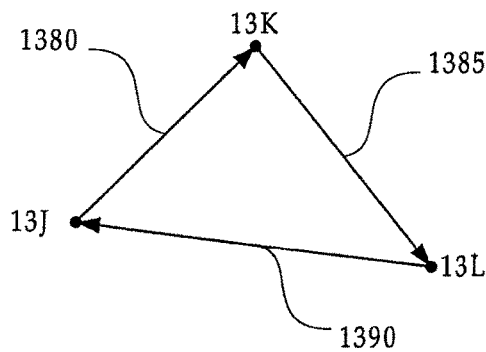

When determining fares for a trip, it is customary to determine to what type of priceable unit the fares will be applied. Most priceable units fall into one of three types of categories: one-way, round trip or open jaw. FIG. 13C provides a simple example for illustrating the distinctions. A trip from 13J through 13K to 13L and back to back to 13J could be grouped into many possible priceable unit combinations. For example, in its simplest form, it is a round trip from 13J to 13L with a stopover at 13K on the outbound leg of the round trip. It could also be a group of three one-way flights, where each fare component 1380, 1385 and 1390 is a one-way priceable unit. Another grouping is the so called "open jaw" flight where the origin of the outbound leg and any subsequent leg(s) of a trip are not necessarily the same (but could be). In one such example, fare components 1380 and 1385 could be part of an open jaw priceable unit, and fare component 1390 would be a one-way priceable unit. One way flights can comprise one or more fare components. Generally, round trip flights and open jaw flight are less expensive than one-way flights, so it is very beneficial to combine flights into these types of priceable units when trying to minimize the cost of a trip. Even from the simple example illustrated in FIG. 13C, it is possible to see that with many breakpoints and only three types of priceable units, the possible permutations that would be added to a solution tree 1400 could quickly make an explicit enumeration of solutions impracticable.

The present invention does not explicitly enumerate every node in a solution tree, such as in solution tree 1400. Rather, at any node, it determines if any child node (e.g., a subnode) could possibly contain an optimal solution. One manner in which this is done is by using a threshold value. If the cost of the partial solution is already determined to be above the threshold value, then that node with the partial solution, and all its child nodes, are deferred from consideration in the solution tree 1500 (thus creating a "sparse" tree). If the threshold were to change, the node might be revisited at a later point, but initially it is not considered. This process may be used in conjunction with a branch-and-bound technique of the present invention.

In accordance with the present invention, a branch-and-bound technique is used to search for best fares by solving for a sequence of partial solutions which are derived from a query. For example, a first level of new partial solutions is created as nodes of a solution tree 1500 such that the partial solutions are only restrained by which breakpoints a trip must pass through, this results in a simpler problem which can be solved more easily with less computation. Branching splits a program into two sub-problems and bounding computes the lower bound (current best case) for each sub-problem. If the lower bound for the sub-problem is no better than the threshold cost, then the entire sub-problem (possible solution) is deferred until the threshold cost increases (if ever). A branch-and-bound process is discussed here as a tree, where every node in the tree represents a sub-problem (partial solution). Initially, the tree is initiated with a single root node which represents a relaxed problem where all variables in the non-root nodes of the tree are relaxed and replaced by the relaxed variable(s) in the root node. At each stage of the branch-and-bound search, one active node is selected and the associated relaxed problem is solved. Depending on the solution, one of the following three actions is taken:

Deferring: If the relaxed problem has a solution that is worse than the current best feasible objective value, then defer processing the node.

Refining: Update the lower bound if the solution is such that for each node the cost would be below the previous lower bound.

Branching: Branch on some node if the relaxed solution is not complete and if it's estimated value is better than the current best feasible solution.

The reason the partial solutions below the deferred node can be ignored until the threshold cost changes is that a number of feasible solutions have already been determined and placed in the MCM 465 during optimization of the fare, schedule and rule records by the preprocessing server 300. If the feasible solution in the MCM 465 is valid and is less costly (based on whatever cost criteria is used, e.g., price, time, etc.) than the partial solution in the node, then there is no point in considering the node or its children as the MCM 465 has a better solution than any that would come from that node. Thus, this is not a heuristic approach that approximates an optimal solution. Rather it is an exact optimizing procedure that finds optimal solutions. In other words, in the above description, the goal is to find a set of solutions that have the minimum cost. In accordance with the present invention, feasible solutions are first found by creating MCM 465 during a preprocessing stage as described earlier. With the information in the MCM 465 any nodes on the tree which cannot result in a solution better than the best previous solution are safely deferred.

Accordingly, what is needed next is a way of computing a "lower bound" on the value of the cost when a partial solution at an intermediate node is completed. This finding of a lower bound is a repetitive (possibly iterative or recursive) process where the lower bound is continuously refined as possible solutions are compared and accepted or rejected as potentially providing a best fare. If one previously cheapest solution is eliminated (e.g., is an invalid fare, no flight available that day, or that carrier will not combine one fare component with another because there is not enough time for a connection) then the next cheapest fare would become the lower bound. In this manner the possible solutions which would provide only higher cost solutions can be systematically ignored unless (until) the lower bound changes again.

As discussed earlier, partial solutions are another name for the intermediate nodes 1510, 1515, 1520 and 1525 (in levels 1-4) in a solution tree 1500. As compared to an initial partial solution (root node) 1505, in which no additional trip information has been added, the complete solutions (leaf nodes) 1530 which are found in level 5 of solution tree 1500, have all the necessary trip information including fare information.

Figure 17A:
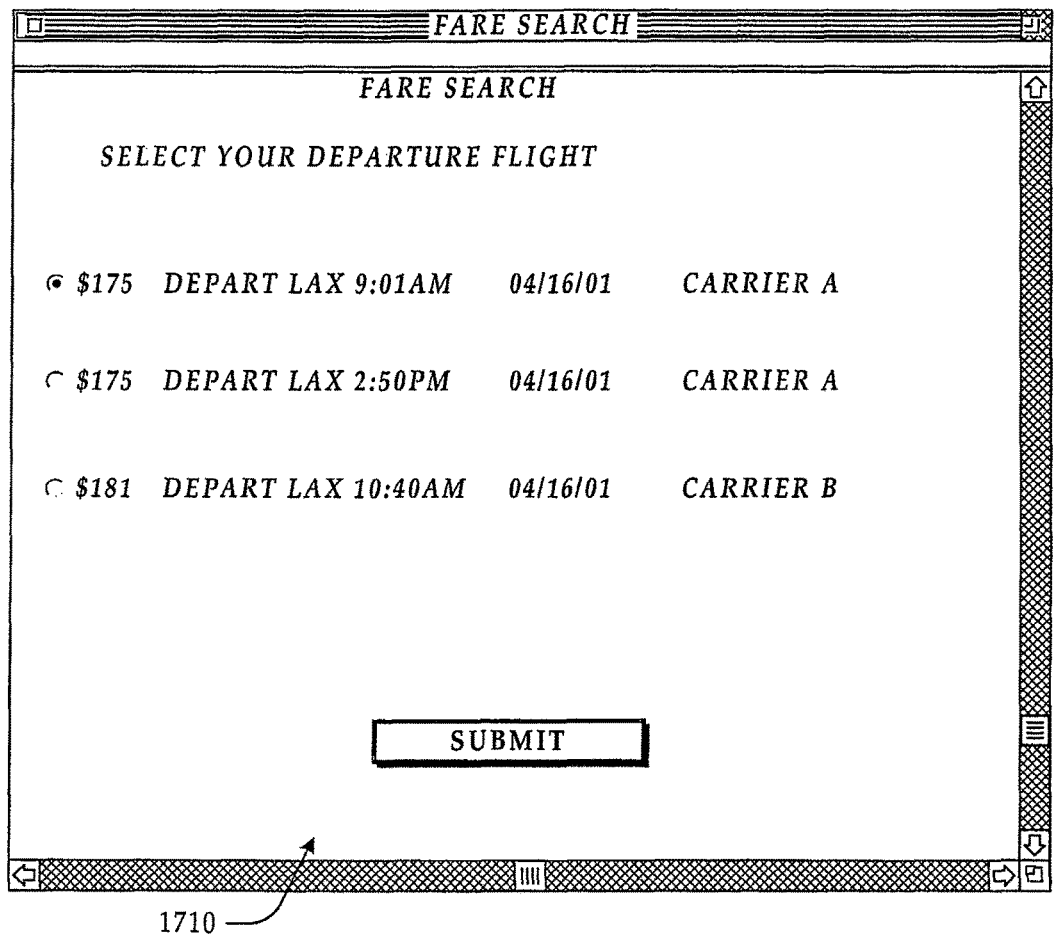
FIGS. 17A-C show exemplary Web pages for displaying a response received to a fare query.
Figure 17B:
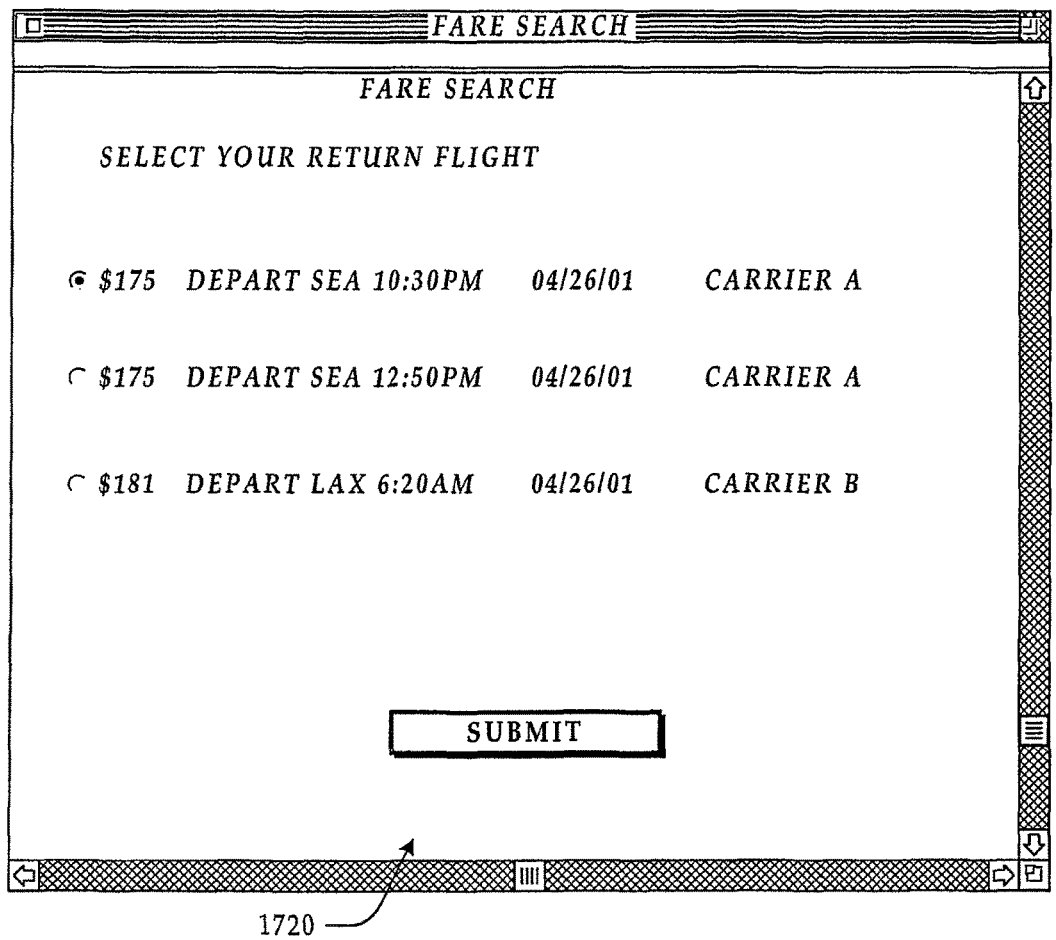
Figure 17C:
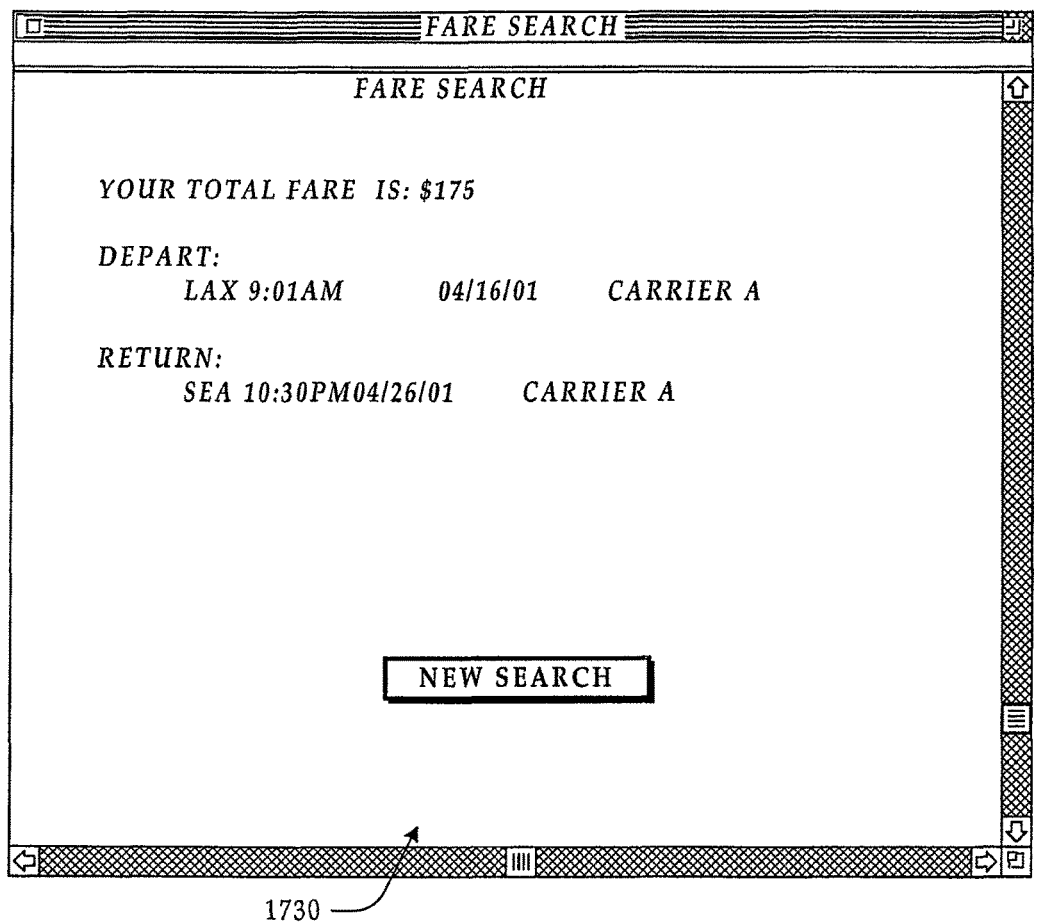

During one exemplary operation of best fare processing (described in much greater detail below with reference to FIGS. 6-12) partial solutions (solution tree nodes) are partitioned (as can be seen in the branched nodes in FIG. 15) according to an arbitrary threshold cost. In one exemplary embodiment the threshold cost starts at $100 and one hour, but any other amount could be used so long as it bares some relation to expected travel costs, possibly as determined by the MCM 465. Each partial solution is evaluated using the MCM 465 to determine if it could feasibly provide a complete solution below the threshold cost. If it could, then further information is added (e.g., the current node is partitioned and nodes at a new level are added) and those new partial solutions are evaluated in turn. If not, then the partial solution is not processed (e.g., it is deferred such as in node 1590), and processing continues until enough complete solutions are found or the processing times out. If enough complete solutions have not been found, time is left, and some partial solutions have not been evaluated, the threshold cost is increased and the unevaluated nodes are revisited with the higher threshold. In one exemplary embodiment the threshold cost increases by $50 and half an hour, but any other amount could be used so long as it bares some relation to expected travel costs, possible as determined by the MCM 465. This continues until enough complete solutions (e.g., enough leaf nodes, which could be any predesignated number, the exemplary Web pages of FIGS. 17A-C provide two sets of three flights, giving a total of nine possible complete solutions) have been found, the solutions are exhausted, or the process times out. At which point, any complete solutions (up to an arbitrary number) are presented to the user (usually with the most optimal solutions presented first).

Figure 6:
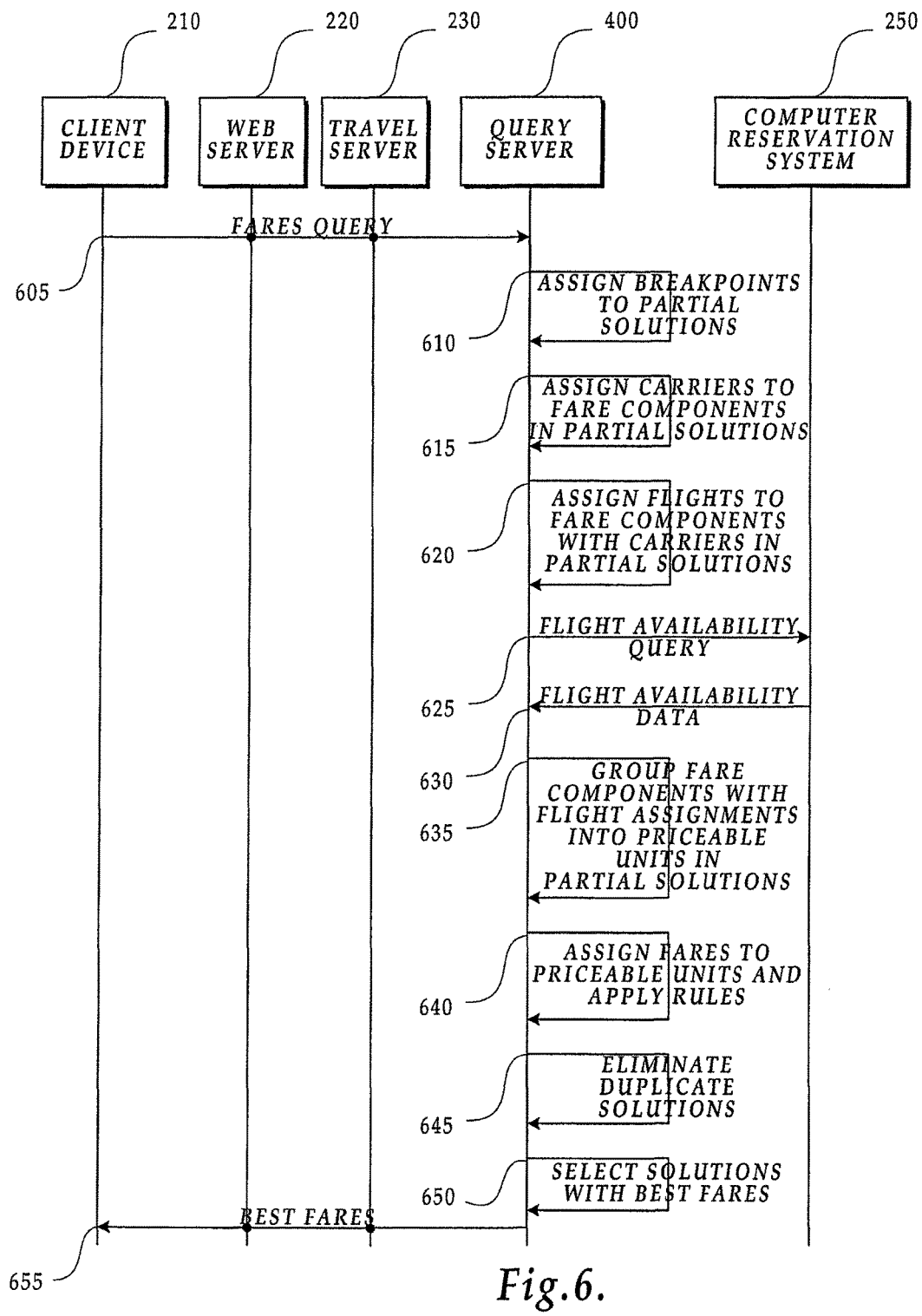
FIG. 6 is a diagram illustrating the actions taken by a client device, Web server, travel server, query server, file server and computer reservation system to determine the best fares in response to a fare query in accordance with the present invention.
Figure 15:
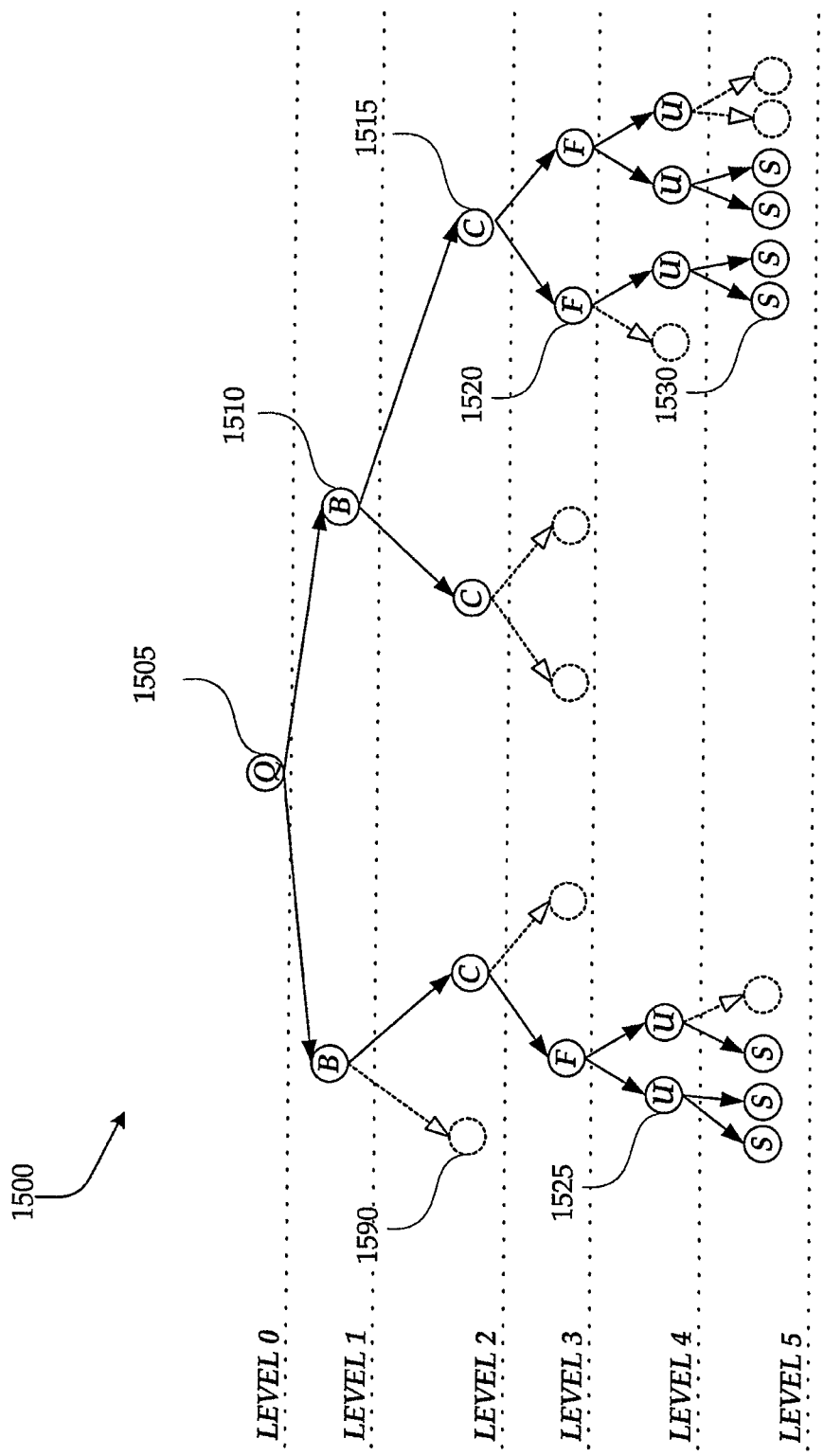
FIG. 15 shows a complete solution tree diagram to aid in understanding the benefits provided by the current invention.

To better illustrate the operation of finding the best fare, FIG. 6 illustrates one exemplary embodiment of actions performed by a system for finding best fares. While air transportation is used below to describe an illustrative application of the present invention, those of ordinary skill in the art will appreciate that the present invention applies equally as well to other forms of transportation. The system of FIG. 6 includes a client device 210, Web server 220, travel server 230, the query server 400, and CRS 250. The interactions of and the routines performed by the various devices are illustrated and described in greater detail later with reference to FIGS. 7-13. Returning to FIG. 6, best fare processing by the query server 400 is initiated when a client device 210 requests fares 605 for a particular trip via a Web page 1600 (such as the Web page 1600 illustrated in FIG. 16). The fare query passes through the Web server 220 and travel server 330 to reach the query server 400. Once the query server 400 receives the fare query, the query server 400 essentially builds a solution tree 1500 (as shown in FIG. 15) for the query. More specifically, fare breakpoints for possible solutions are determined and assigned 610 to partial solutions. Then, the query server 400 assigns possible carriers 615 to the fare components defined by the breakpoints (a fare component is the segment between two breakpoints). Next, flights are assigned 620 to fare components that have assigned carriers. Meanwhile, the query server 400 also checks for flight availability 625 from the CRS 250. The CRS 250 responds with flight availability data 630, after which the query server checks for duplicate flights. This prevents listing the same flight, but at a higher price. The query server 400 then takes the fare components with flights and groups 635 these into priceable units. These priceable units are then assigned fares 640 along with any rules, taxes and/or surcharges. Any duplicate solutions (same flight, but the same or a higher price) are then eliminated 645. The remaining solutions are then reviewed to select the best solutions 650 and the fares are forwarded to the client device 210 via the travel server 230 and the Web server 220. Exemplary fare presentation Web pages 1710, 1720 and 1730 are illustrated in FIGS. 17A-C. The details of the processing on the query server 400 are described in more detail below with regard to FIG. 7.

It will be appreciated by those of ordinary skill in the art that the components of FIG. 6 may be altered without substantially affecting the operation of the present invention. For example, the query server 400 and the travel server 230 and/or the Web server 220 may coexist on the same computing device without detracting from the operation of the current invention.

Figure 7:
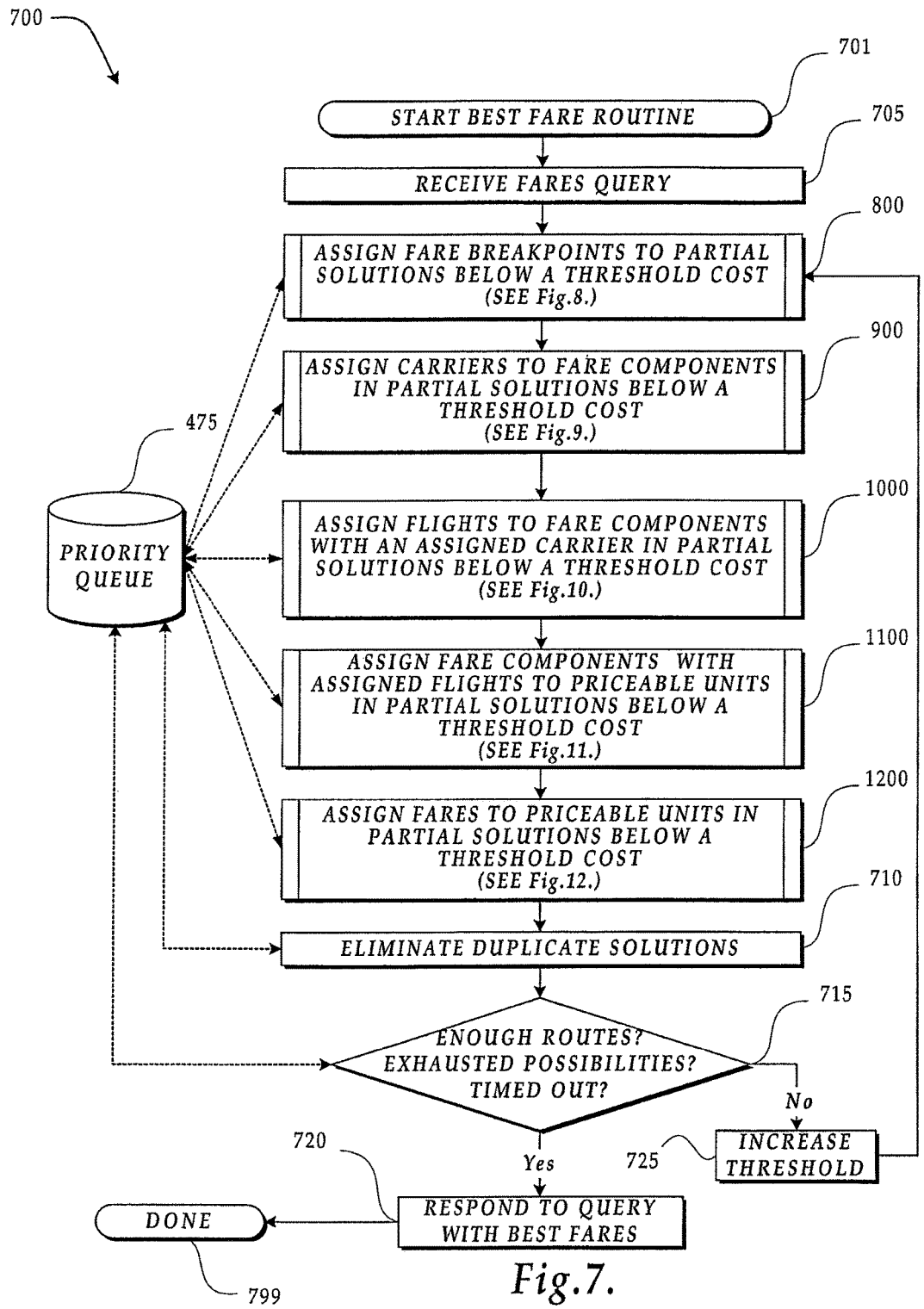
FIG. 7 is an overview flow diagram illustrating a best fare search routine implemented by the query server to determine best fares in accordance with the present invention.

As illustrated in FIGS. 2, 4 and 6, the present invention comprises a query server 400 that is used to determine the best fares requested by a client device 210. A flow chart illustrating the best fare routine 700 implemented by the query server 400 to determine the best available fare(s) in accordance with one actual embodiment of the present invention is shown in FIG. 7. The best fare routine 700 begins in block 701 and proceeds to block 705, where a fare query is received. The query could come from a myriad of sources, such as third party travel servers or carriers, but for exemplary purposes, one embodiment of the present invention has the query forwarded from a customer using a client device 210. The information in the query is used next in subroutine block 800 (described in more detail below with regard to FIG. 8) to add fare breakpoints to partial solutions and add those partial solutions below a threshold cost to a solution tree 1500 stored in the priority queue 475. The logic continues to subroutine block 900 (described in more detail below in reference to FIG. 9) where the fare components defined by the breakpoints found in block 800 are assigned carriers, if they form partial solutions below a threshold cost. These carrier assignments are added to the partial solutions in the priority queue 475. Once the carriers have been assigned, processing continues to subroutine block 1000 (described below in detail for FIG. 10) where flights are assigned to fare components having carriers and that would form partial solutions below a threshold cost. These flight assignments update the partial solutions of the solution tree 1500 stored in the priority queue 475. Next, in subroutine block 1100 (described in more detail with regard to FIG. 11) the fare components with flight assignments are grouped to form priceable units if the resulting partial solution is below a threshold cost. These priceable units are then used to update the partial solutions in the priority queue 475. Accordingly in subroutine block 1200 (described below with regard to FIG. 12) it is then possible to assign fares to the priceable units where the resulting partial solution would be below the threshold value. The partial solutions in the priority queue 475 would also be updated with these assignments. The processing would continue to block 710 where any partial solutions with the same trip information (except for fare information) would be eliminated. Providing fare data on the same flights, but with the same or higher fare is not necessary. Then, in decision block 715 a determination is made whether an ending scenario has been reached (e.g., a predetermined set of complete solutions, all possibilities exhausted or the process has timed out beyond some predetermined time limit). If no ending scenario was determined to have been reached in decision block 715, then processing continues to block 725 where the threshold cost is increased by an arbitrarily selected predetermined amount and processing returns to subroutine block 800. If an ending scenario was reached in decision block 715, then processing continues to block 720 where the lowest cost solutions (each containing a complete trip description with one or more priceable units and associated fares) are dequeued from the priority queue and a response to the fare query is generated by retrieving (and totaling) the total price of fares from each lowest cost solution, along with the trip description for the lowest cost solutions. The final price and trip description are then formatted (such as in Web pages 1710, 1720 and 1730 of FIGS. 17A-C) and sent to the requesting device. Routine 700 ends at block 799.

As mentioned above, a number of subroutines are described in FIGS. 8-12. Each subroutine partitions and adds further information to the solution tree 1500 of possible solutions. Before examining the subroutines in detail, it is helpful to consider the two solution trees 1400 and 1500 illustrated in FIGS. 14 and 15 respectively.

In FIG. 14, as each additional piece of trip information is added to the solution tree 1400, at each level, the number of partial solutions exponentially increases. Each additional layer in this prior art example partitions the previous partial solutions into two more partial solutions. However, as will be shown in the following subroutines, a process of "deferring" nodes from consideration when building the tree creates a much more manageable solution tree 1500. Only the solutions that are below a certain cost are considered and those with a cost that is too high are not considered (i.e. "deferred") for further processing until the threshold cost increases.

As shown in FIG. 15, processing begins with a root node 1505 representing the fare query. No details have been added to any other nodes in the solution tree 1500 at this point. At level 1, partial solutions with fare breakpoints 1510 are added (see FIG. 8) to the solution tree 1500, in example solution tree 1500 both breakpoints allow for partial solutions below the threshold cost. At level 2, carriers 1515 are assigned (see FIG. 9), but only three of the four partial solutions meet the threshold cost. Next, at level 3 flights are assigned 1520 to fare components with assigned carriers (see FIG. 10), and only three of the six partial solutions meet the threshold cost. In turn, level 4 fare components are assigned to priceable units 1525 (see FIG. 11), and only five of the six partial solutions meet the threshold cost. Finally at level 5, the fares (including taxes and some changes) are assigned to the priceable units (see FIG. 12), and only seven of the ten partials solutions meet the threshold cost. Only the level 5 nodes, represent the set of complete solutions 1530, so instead of thirty-two possible solutions as in FIG. 14, there are only ten. It is a much simpler task then to select the lowest cost complete solutions (leaf nodes) from the solution tree 1500. In one embodiment of the present invention the selection is aided by storing the complete solutions in a priority queue 475 which allows the removal of the lowest cost solutions first.

Now that a general overview of the building of the deferred solution tree 1500 via FIGS. 8-12 and subroutines 800-1200 has been provided, subroutines 800-1200 and FIGS. 8-12 will each be described in more detail.

Figure 8:
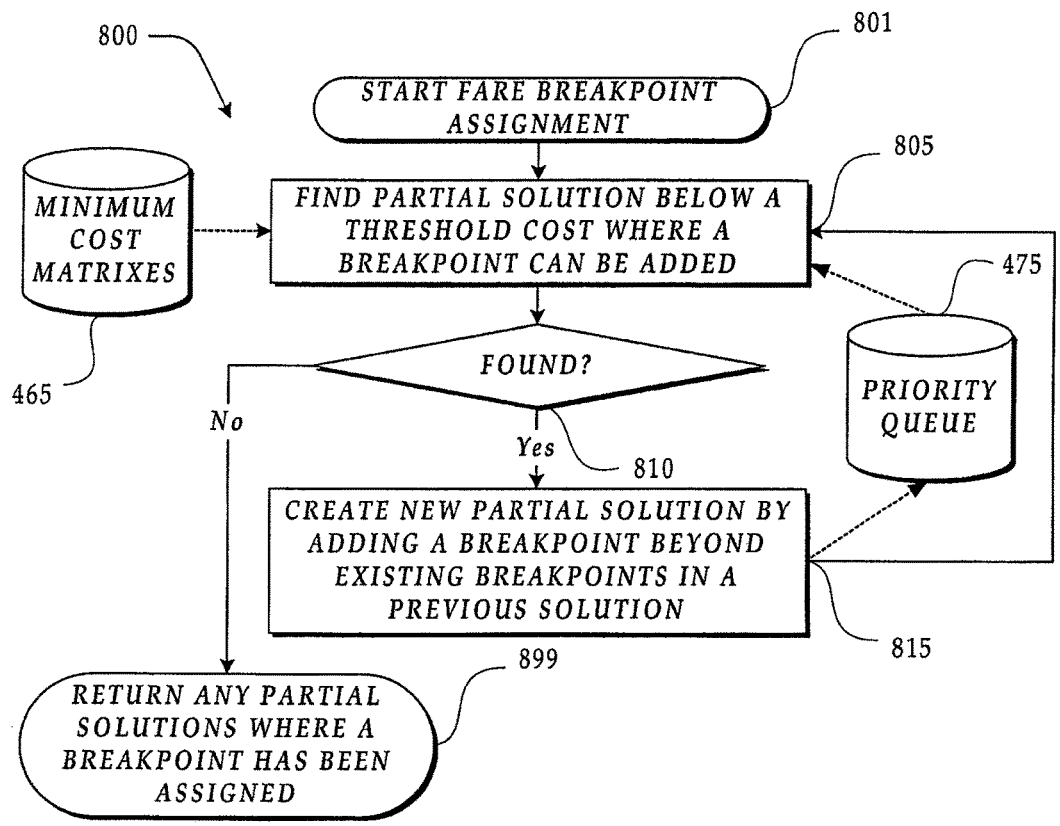
FIG. 8 is an overview flow diagram illustrating a fare breakpoint determination subroutine implemented by the query server.

Starting with FIG. 8, subroutine 800 begins at block 801 and proceeds to block 805, where a new breakpoint (any airport present in the data may be added as a breakpoint) is retrieved from the MCM 465 and is sought to be added to a new unique partial solution in level 1 of a solution tree 1500, such that the new partial solution will not exceed a threshold cost (in one exemplary embodiment, the same threshold is used in the calling routine), the breakpoint does not duplicate one already in another partial solution and some carrier publishes fares and provides transportation from the previous breakpoint. For purposes of discussion of the present invention, exemplary solution tree 1500 will be used; however, one of ordinary skill in the art will appreciate that a solution tree used by an actual embodiment of the present invention may be of considerable more complexity and may possibly include more levels and/or nodes than the solution tree 1500 illustrated in FIG. 15. Any previous partial solutions to which a breakpoint is to be added are retrieved from the priority queue 475. The cost of potential new unique partial solution is determined using the costs in the preprocessed MCM 465 to determine what a minimum feasible cost will be. More specifically, the cost of a partial solution is calculated using all known trip information and then by using the MCM 465 to complete any unknown trip information with minimum cost feasible trip information. In block 805 this means that only the user query and any previously determined breakpoints are known trip information, so the MCM 465 would supply minimum cost feasible carrier, flight, priceable unit and fare information to a new unique possible solution. As each new piece of trip information is added to the partial solutions, the cost of the partial solution will be refined, and will possibly increase, thereby removing it from consideration if the increased cost exceeds the threshold.

If a breakpoint was not found in decision block 810, processing continues to block 899, where any partial solutions in which a breakpoint has been added, are returned to the calling routine. Otherwise, if a breakpoint was found, then a new unique partial solution is created by adding a breakpoint to any existing breakpoints in a previous solution, possibly even adding the destination as a final breakpoint in block 815, and adding the new unique breakpoint to the priority queue 475. Processing then returns to block 805 to search for any more partial solutions in which a breakpoint may be added.

Subroutine 800 is used to populate level 1 of the solution tree 1500. Repeated calls to subroutine 800 will (if available) provide the possible solutions (i.e., level 1 nodes) that will then be used to build the next levels (i.e., level 2 nodes and so on) of the solution tree 1500. Level 1 is not built all at once by subroutine 800, rather, by iterations or recursions subroutine 800 is repeatedly called and incrementally adds possible solutions that are below the current threshold cost. However, once subroutine 800 has finished, it is then possible that a partial solution has been added that will provide a best fare, so routine 700 would then call the next subroutine 900 for building level 2 of the solution tree 1500.

Figure 9:
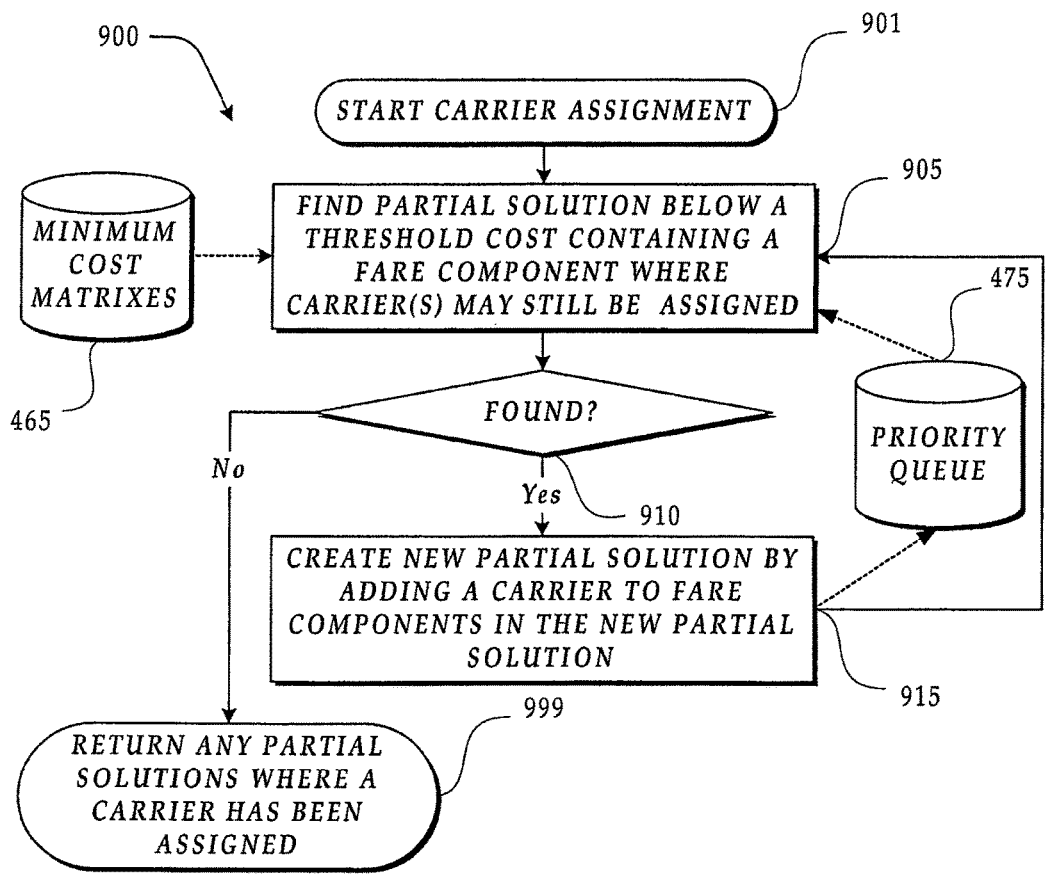
FIG. 9 is an overview flow diagram illustrating a carrier assignment subroutine implemented by the query server.

In FIG. 9, the building of the solution tree 1500 continues at the next level by adding carrier information retrieved from the MCM 465. Subroutine 900 begins at block 901 and proceeds to block 905, which tries to find a carrier which publishes fares and provides transportation over the fare component to be added to a fare component to form a partial solution that will not exceed a threshold cost (in one exemplary embodiment, the same threshold is used in the calling routine) also using the MCM 465. The partial solutions with breakpoint assignments are retrieved from the priority queue 475. The cost of a potential new unique partial solution is determined using the costs in the preprocessed MCM 465 to determine what a minimum feasible cost will be. More specifically, the cost of a new partial solution is calculated using all known trip information and then by using the MCM 465 to complete any unknown trip information with minimum cost feasible trip information. In block 905 this means that only the user query, breakpoint(s) and previously assigned carrier(s) are known trip information, so the MCM 465 would supply minimum cost feasible flight, priceable unit and fare information to a new unique possible solution. As each new piece of trip information is added to the partial solutions, the cost of the partial solution will be refined, and will possibly increase, thereby removing it from consideration if the increased cost exceeds the threshold. If such a carrier was not found in block 905, processing continues to block 999, where any partial solutions to which a carrier has been added are returned to the calling routine (in this case, the best fare routine 700). Otherwise, if a carrier was found, then a new unique partial solution is created by adding the carrier to a fare component retrieved form a previous solution in block 915 and adding the partial solution to the solution tree 1500 stored in the priority queue 475. Processing then returns to block 905 to search for any more partial solutions in which a carrier may be added.

Similar to subroutine 800, subroutine 900 is used to populate level 2 of the solution tree 1500. Repeated calls to subroutine 900 will (if available) provide the carriers to possible solutions provide (i.e. level 2 nodes) that will then be used to build the next levels (i.e., level 3 nodes and so on) of the solution tree 1500. Subroutine 900 is repeated called and incrementally adds solutions that are below the current threshold cost. However, once subroutine 900 has finished, it is then possible that a partial solution has been added that will provide a best fare, so routine 700 would then call the next subroutine 1000 for building level 3 of the solution tree 1500.

Figure 10:
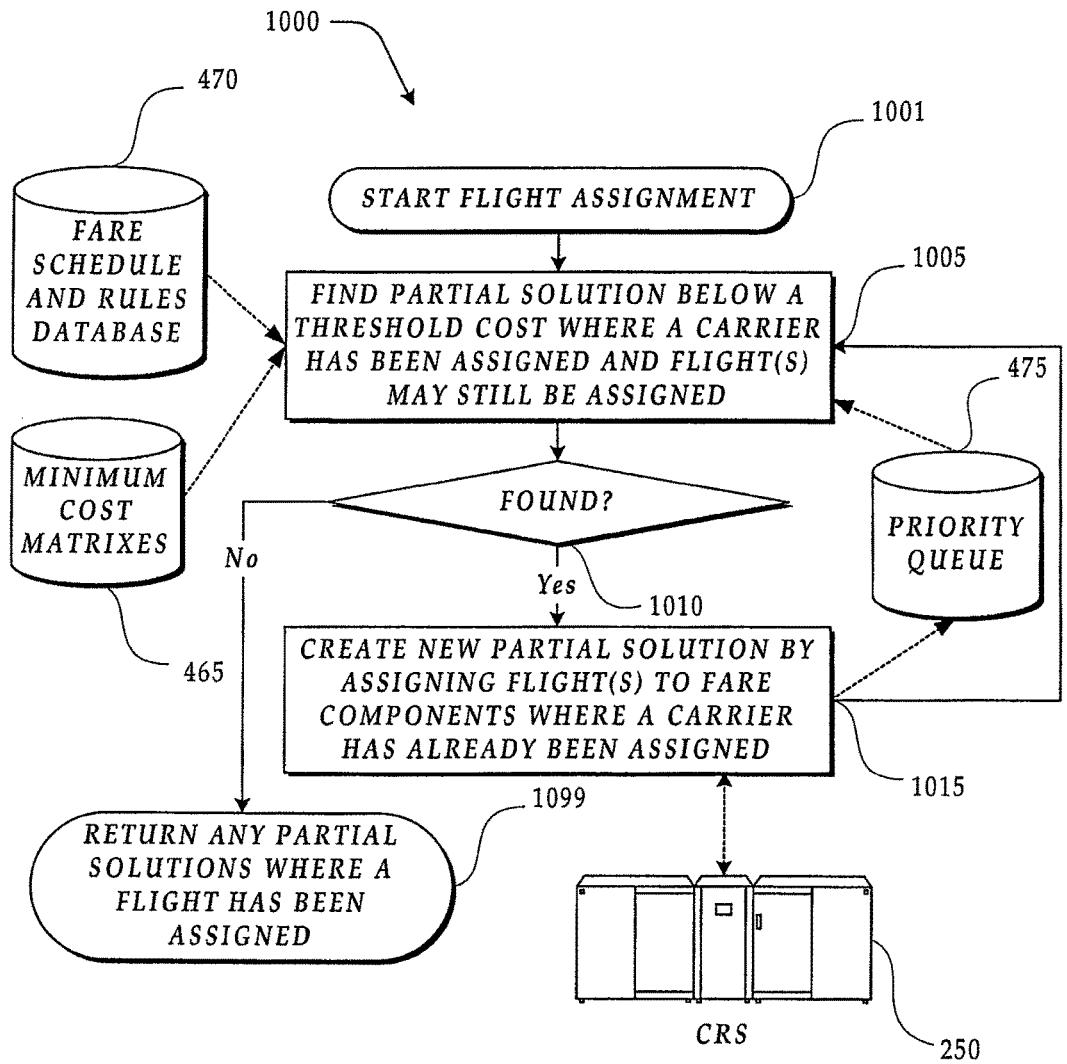
FIG. 10 is an overview flow diagram illustrating a flight assignment subroutine implemented by the query server.

FIG. 10 continues with the building of the solution tree 1500 by adding flights to assigned carriers. Subroutine 1000 begins at block 1001 and proceeds to block 1005, which tries to find a flight from the FSR 470 to be added to a fare component with an assigned carrier to form a partial solution that will not exceed a threshold cost (in one exemplary embodiment, the same threshold is used in the calling routine). Block 1005 uses both the MCM 465 and the schedule records of the FSR 470 to determine which flights are least costly and available for assignment. The partial solutions with carrier assignments are retrieved from the priority queue 475. The cost of a potential new unique partial solution is determined using the costs in the preprocessed MCM 465 to determine what a minimum feasible cost will be. More specifically, the cost of a new partial solution is calculated using all known trip information and then by using the MCM 465 to complete any unknown trip information with minimum cost feasible trip information. In block 1005 this means that only the user query, breakpoint(s), carrier(s) and previously assigned flight(s) are known trip information, so the MCM 465 would supply minimum cost feasible priceable unit and fare information to a new unique possible solution. As each new piece of trip information is added to the partial solutions, the cost of the partial solution will be refined, and will possibly increase, thereby removing it from consideration if the increased cost exceeds the threshold. If a flight was not found in block 1005, processing continues to block 1099, where any partial solutions where a flight has been added are returned to the calling routine. Otherwise, if a flight was found, then a new unique partial solution is created by adding a flight (retrieved from the CRS 250) to a fare component with an assigned carrier in block 1015 and adding it to the solution tree 1500 stored in the priority queue 475. Processing then returns to block 1005 to search for any more partial solutions in which a flight may be added.

Similar to subroutines 800 and 900, subroutine 1000 is used to populate level 3 of the solution tree 1500. Repeated calls to subroutine 1000 will (if available) provide the flights the possible solutions (i.e. level 3 nodes) that will then be used to build the next levels (i.e., level 4 nodes and so on) of the solution tree 1500. Subroutine 1000 is repeated called and incrementally adds solutions that are below the current threshold cost. However, once subroutine 1000 has finished, it is then possible that a partial solution has been added that will provide a best fare, so routine 700 would then call the next subroutine 1100 for building level 4 of the solution tree 1500.

Figure 11:
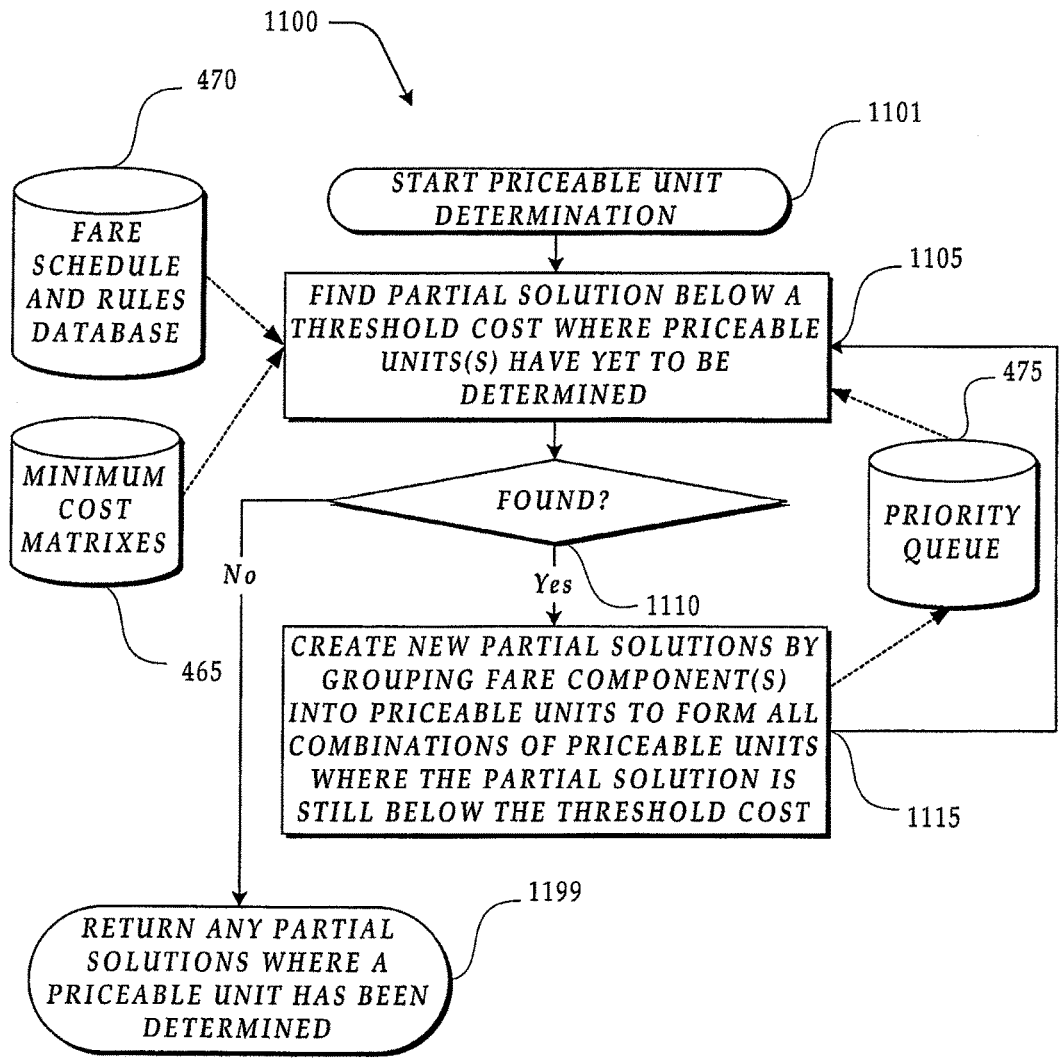
FIG. 11 is an overview flow diagram illustrating a priceable unit determination subroutine implemented by the query server.

FIG. 11 continues to build the solution tree 1500 by grouping fare components into priceable units. Subroutine 1100 begins at block 1101 and proceeds to block 1105, which tries to find a partial solution that will not exceed a threshold cost (in one exemplary embodiment, the same threshold is used in the calling routine) where flight(s) have been assigned, but priceable units (retrieved from the FSR 470) have yet to be determined. Block 1105 uses the FSR 470 to determine which priceable units are available for determination. The partial solutions with flight assignments are retrieved from the priority queue 475. The cost of a potential new unique partial solution is determined using the costs in the preprocessed MCM 465 to determine what a minimum feasible cost will be. More specifically, the cost of a new partial solution is calculated using all known trip information and then by using the MCM 465 to complete any unknown trip information with minimum cost feasible trip information. In block 1105 this means that the user query, breakpoint(s), carrier(s) and flight(s) are known trip information, so the MCM 465 would supply minimum cost feasible fare information, while the FSR 470 would supply the actual priceable unit information to a new unique possible solution. As each new piece of trip information is added to the partial solutions, the cost of the partial solution will be refined, and will possibly increase, thereby removing it from consideration if the increased cost exceeds the threshold. If a partial solution below the threshold cost where priceable units have yet to be defined was not found in block 1105, processing continues to block 1199, where any partial solutions, in which a priceable units(s) has been determined, are returned to the calling routine. Otherwise, if a partial solution meeting the criteria was found, then new unique partial solution(s) are created by grouping (as described above with reference to FIG. 13C) fare component(s) into priceable unit(s) in all possible combinations where the partial solutions are still below the threshold cost. These new partial solutions are then added to and adding it to the priority queue 475. Processing then returns to block 1105 to search for any more partial solutions in which priceable units have yet to be determined.

Similar to subroutines 800, 900 and 1000, subroutine 1100 is used to populate level 4 of the solution tree 1500. Repeated calls to subroutine 1100 will (if available) provide priceable units to the possible solutions (i.e. level 4 nodes) that will then be used to build the next level (i.e., level 5 nodes) of the solution tree 1500. Subroutine 1100 is repeated called and incrementally adds possible solutions that are below the current threshold cost. However, once subroutine 1100 has finished, it is then possible that a partial solution has been added that will provide a best fare, so routine 700 would then call the next subroutine 1200 for building level 5 of the solution tree 1500.

Figure 12:
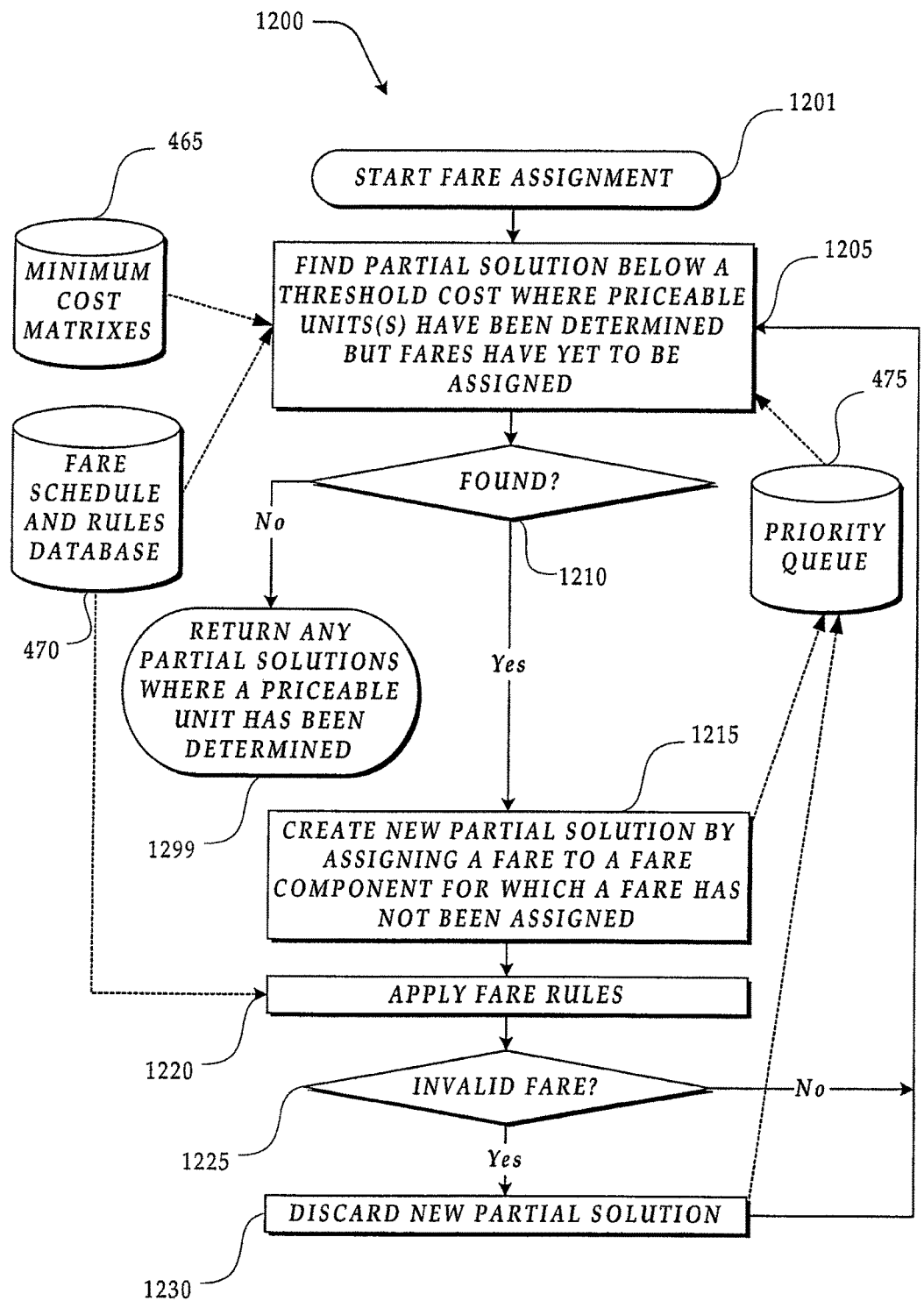
FIG. 12 is an overview flow diagram illustrating a fare assignment subroutine implemented by the query server.

FIG. 12 adds the final trip information to any eligible partial solutions of the solution tree 1500 by assigning fares to the partial solutions, thereby creating complete solutions (leaf nodes in solution tree 1500). Subroutine 1200 begins at block 1201 and proceeds to block 1205, which tries to find a fare to be added to a partial solution with defined priceable unit(s) and that will form a complete solution that will not exceed a threshold cost (in one exemplary embodiment, the same threshold is used in the calling routine). Block 1205 uses both the MCM 465 and the FSR 470 to determine which fares are least costly and available for assignment. The partial solutions with priceable unit assignments are retrieved from the priority queue 475. More specifically, the cost of a new partial solution is calculated using all known trip information and then by using the MCM 465 and FSR 470 to complete any unknown trip information with feasible or actual fares for priceable units respectively. In block 1105 this means that the user query, breakpoint(s), carrier(s), flight(s) and priceable unit(s) are known trip information, so the FSR 470 would supply minimum actual fare information to a new unique possible solution, but if all the fares had yet to be assigned for a trip, then MCM 465 would supply feasible fares as well. As each new piece of trip information is added to the partial solutions, the cost of the partial solution will be refined, and will possibly increase, thereby removing it from consideration if the increased cost exceeds the threshold. Next, decision block determines if a fare was found. If no fare was found in decision block 1210, processing continues to block 1299, where any complete solutions, to which a fare has been added, are returned to the calling routine. It is at this point that the best fare routine 700 will have to determine if it has reached an ending condition (sufficient complete solutions, exhausted all possible solutions, or times out).

Otherwise, if a fare was found in decision block 1210, then a new partial solution is created by adding a fare (retrieved from the FRS 470) for which a fare has not been assigned in block 1215 and adding it to the priority queue 475. Next in block 1220 the fare rules, retrieved from the FSR 470 are applied to determine if any pricing changes need to be applied or if the fare is invalid. Processing continues to decision block 1225 where a determination is made whether the fare assigned in block 1215 to the new partial solution is an invalid fare. If in decision block 1225 it is determined that the new partial solution contains an invalid fare, then the new partial solution is discarded and removed from the priority queue 475. Processing then returns to block 1205 to search for any more partial solutions in which a fare may be added. If in decision block 1225 it is determined that it is not conclusively an invalid fare, then processing returns to block 1205 to search for any more partial solutions in which a fare may be added.

Similarly to subroutines 800, 900, 1000 and 1100, subroutine 1200 is used to populate level 5 of the solution tree 1500. However, unlike subroutines 800, 900, 1000 and 1100, repeated calls to subroutine 1200 will (if available) provide the complete solutions that will be used to build the final level of the solution tree 1500. Subroutine 1200 is repeated called and incrementally adds complete solutions that are below the current threshold cost. Once subroutine 1200 has finished, it is then possible to determine in routine 700 if an ending condition has been met. Ideally in routine 700 it will be determined that sufficient complete solutions have been found, in which case no more calls to subroutines 800, 900, 1000, 1100 or 1200 are needed and the best fares have been found (or in rare circumstances, no fares were found, or only a limited number of fares due to a time out condition).

As can seen from the above discussion of the subroutines in FIG. 7-12, each addition of trip information is handled in a similar manner. Each subroutine creates new partial solutions (complete solutions in the case of subroutine 1200), which are added to the solution tree 1500 in the priority queue 475 as they are created. By placing these solutions in the priority queue 475, when they are later examined for consideration as a possible lowest cost solutions containing, only the most likely candidates for the best fares are examined first because the priority queue 475 is designed to provide the possible solutions in a lowest cost first manner as they are dequeued. Further, assuming that the best fare routine 700 was not interrupted, no partial solutions should ever be removed from the priority queue. Specifically, if all possible combinations of trip information were tried, then all nodes should be complete solutions. One the other hand if a sufficient number of complete solutions were found in decision block 715, then by removing that number of complete solutions from the priority queue there should still be no partials solutions removed, as the complete solutions are necessarily lower cost (having beaten the threshold, while the partial solutions did not), and there are a sufficient number of complete solutions.

It is important to note that the best fare routine 700 is one possible best fare routine of if present invention, in another exemplary embodiment of the present invention, possible solutions in a solution tree are examined both "forward" and "backward". FIG. 13B illustrates a number of "breakpoints forward" 13A-E and "breakpoints backward" 13V-Z on either side of an imaginary "middle" 1355 of the trip. In this embodiment, the solution tree 1500 is built by examining flights both from the origin (forward), but also from the destination (backward) and once likely partial solutions are determined for both the forward portion and the backward portion, then are combined as partial solutions 1360 and 1370. This forward and backward partitioning could be applied at each level of the best fare routine, such that FIGS. 7-12 would include examinations forward and examinations back when partitioning and adding partial solutions. One benefit of this "forward and backward" processing is a yet further decomposition of the problem of finding solutions into smaller problems, such that it is better suited to recursive and/or parallel processing. In particular, in one actual embodiment of the present invention, this decomposition has allowed a best fare routine to be run on personal computers rather than on much more expensive mainframe computers.

While the preferred embodiment of the invention has been illustrated and described, it will be appreciated that various changes can be made therein without departing from the spirit and scope of the invention.

What is claimed is:

1. A method of building a sparse fare tree data structure for finding at least one database record indicating a fare for travel inventory, the method comprising:
storing, in a fare database, records including information regarding acquirable travel items, wherein each record of at least some of the records indicates a cost of a travel item corresponding to the record;
in response to a fare query, generating, in a memory, a sparse tree data structure enabling selective traversal of records within the fare database to locate travel items responsive to the fare query, wherein the sparse tree data structure comprises a root node;
initializing, in the memory, a priority queue for storing one or more query results to the fare query, each query result corresponding to one or more criteria for identifying a record within the fare database and indicating a lowest cost of one or more travel items corresponding to the record identified by the query result;
appending a first node to the root node of the sparse tree in the memory, the first node representing a first set of criteria for the records of the fare database, the first set of criteria including a value for a first parameter of the records;
retrieving, from the fare database, a first set of records corresponding to first set of criteria;
assigning a lowest cost indicated by the first set of records as a cost of the first node;
when the cost of the first node of the sparse tree data structure is less than or equal to a revisable lower bound, wherein the lower bound is equal to the lowest cost of any query results within a priority queue,
storing the first set of criteria represented by the first node, together with the cost of the first node, as a partial query result in the priority queue,
appending a second node to the first node of the sparse tree in the memory, the second node representing a second set of criteria for the records of the fare database, the second set of criteria including the value for the first parameter of the records represented by the first node and a value for a second parameter of records in the fare database,
retrieving, from the fare database, a second set of records corresponding to the second set of criteria, and
assigning a lowest cost indicated by the second set of records as a cost of the second node;
when the cost of the second node of the sparse tree data structure is less than or equal to the revisable lower bound,
storing the second set of criteria, together with the cost of the second node, as a partial query result in the priority queue,
appending a third node to the second node of the sparse tree in the memory, the third node representing a third set of criteria for the records of the fare database, the third set of criteria including the value for the first parameter of the records represented by the first node, the value for the second parameter represented by the second node, and a value for a third parameter of records in the fare database,
retrieving, from the fare database, a third set of records corresponding to third set of criteria, and
assigning a lowest cost indicated by the third set of records as a cost of the third node;
when the cost of the third node of the sparse tree data structure is less than or equal to the revisable lower bound,
storing the third set of criteria, together with the cost of the third node, as a partial query result in the priority queue,
appending a fourth node to the third node of the sparse tree in the memory, the fourth node representing a fourth set of criteria for the records of the fare database, the fourth set of criteria including the value for the first parameter of the records represented by the first node, the value for the second parameter represented by the second node, the value for the third parameter represented by the third node, and a value for a fourth parameter of records in the fare database,
retrieving, from the fare database, a fourth set of records corresponding to fourth set of criteria, and
assigning a lowest cost indicated by the fourth set of records as a cost of the fourth node; and
when the cost of the fourth node of the sparse tree data structure is less than or equal to the revisable lower bound,
storing the fourth set of criteria, together with the cost of the fourth node, as a partial query result in the priority queue,
appending a fifth node to the fourth node of the sparse tree in the memory, the fifth node representing a fifth set of criteria for the records of the fare database, the fifth set of criteria including the value for the first parameter of the records represented by the first node, the value for the second parameter represented by the second node, the value for the third parameter represented by the third node, the value for the fourth parameter represented by the fourth node, and a value for a fifth parameter of records in the fare database,
retrieving, from the fare database, a fifth set of records corresponding to fifth set of criteria, and
assigning a lowest cost indicated by the fifth set of records as a cost of the fifth node;
when the cost of the fifth node of the sparse tree data structure is less than or equal to the revisable lower bound and an ending condition is satisfied,
storing the fifth set of criteria, together with the cost of the fifth node, as a complete query result to the fare query in the priority queue, and
providing the complete query result from the priority queue in response to the fare query; and
deferring processing of at least one additional node of the sparse tree data structure representing a sixth set of criteria for records of the fare database when a lowest cost indicated by records of the fare database corresponding to the sixth set of criteria is greater than the revisable lower bound, and not appending child nodes to the at least one additional node as long as the lowest cost indicated by records of the fare database corresponding to the sixth set of criteria is greater than the revisable lower bound, such that building of the sparse tree in the data structure is completed without determining criteria for the child nodes of the at least one additional node and without retrieving, from the fare database, records constrained by the criteria for the child nodes of the at least one additional node;

wherein the method is implemented by at least one computing device.

2. The computer-implemented method of claim 1, wherein the ending condition is satisfied if:
a selected number of complete query results are generated; or
a selected time duration elapses after receipt of the fare query.

3. The computer-implemented method of claim 1, wherein the revisable lower bound is increased when the ending condition is not satisfied.

4. The computer-implemented method of claim 3 further comprising:
assigning the lowest cost indicated by records of the fare database corresponding to the sixth set of criteria as a cost of the at least one additional node;
determining that the cost of the at least one additional node is less than or equal to the increased revisable lower bound
storing the six set of criteria, together with the cost of the at least one additional node, as a partial query result in the priority queue;
appending a child node to the at least one additional node, the child node representing a seventh set of criteria for records of the fare database, the seventh set of criteria including the six set of criteria and a value for an additional parameter;
retrieving, from the fare database, an additional set of records corresponding to the seventh set of criteria; and
assigning a lowest cost indicated by the additional set of records as a cost of the child node.

5. The computer-implemented method of claim 4, wherein when the cost of the fifth node is less than or equal to the increased, revisable lower bound and the ending condition is satisfied, a travel item corresponding to a record identified by the fifth set of criteria is provided in response to the fare query as the complete fare solution.

6. The computer-implemented method of claim 1, wherein the costs of the partial and complete query results are assigned based at least in part on a minimum cost matrix that contains lowest costs for records corresponding to one or more of the first, second, third, fourth, or fifth set of criteria.

7. The computer implemented method of claim 6, wherein the minimum cost matrix further contains lowest costs for records identifying travel items enabling travel between a travel origin and a travel destination and is generated prior to receipt of the fare query.

8. The computer implemented method of claim 6, wherein the set of criteria comprises at least one of breakpoints, airline carriers, airline flights, priceable units of airline flights, or fares for the travel items.

9. The computer implemented method of claim 1, wherein the travel items comprise at least one of air travel inventory, rail travel inventory, road travel inventory, water travel inventory, lodging inventory, or vehicle rental inventory.

10. The computer-implemented method of claim 1, wherein the complete query results indicate records corresponding to one or more priceable units, each of which is assigned a fare, and wherein the total price of a travel item corresponding to a complete fare solution comprises the sum of the fares assigned to its respective priceable units.

* * * * *